(12) United States Patent
Kuroda

(10) Patent No.: US 7,372,590 B2
(45) Date of Patent: May 13, 2008

(54) PRINTING METHOD, PRINTING APPARATUS, PRINTING PROGRAM EXECUTABLE BY INFORMATION PROCESSING APPARATUS, AND COMPUTER-READABLE STORAGE MEDIUM STORING PROGRAM

(75) Inventor: Shigeki Kuroda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 987 days.

(21) Appl. No.: 10/443,088

(22) Filed: May 22, 2003

(65) Prior Publication Data

US 2004/0017580 A1    Jan. 29, 2004

(30) Foreign Application Priority Data

May 31, 2002   (JP)   ............................. 2002/159788

(51) Int. Cl.
  *G06F 3/00*      (2006.01)
  *G06F 15/00*     (2006.01)
(52) U.S. Cl. .................. 358/1.15; 358/1.13; 358/1.14; 358/1.18; 710/15; 710/16; 709/216; 709/226
(58) Field of Classification Search ............... 358/1.13, 358/1.15, 1.18, 1.14; 709/225, 226, 216; 710/15–19
See application file for complete search history.

(56) References Cited

U.S. PATENT DOCUMENTS 7,231,369 B2 * 6/2007 Hirabayashi ................. 705/51
2002/0163665 A1  11/2002 Iwata et al. ................. 358/1.15

FOREIGN PATENT DOCUMENTS

JP    11-232054    8/1999
JP    2001-290625  10/2001

OTHER PUBLICATIONS

U.S. Appl. No. 10/383,622, filed Mar. 10, 2003.

* cited by examiner

*Primary Examiner*—Douglas Q. Tran
*Assistant Examiner*—Chan S Park
(74) *Attorney, Agent, or Firm*—Fitzpatrick, Cella, Harper & Scinto

(57) ABSTRACT

The present invention can switch a group printer driver controlling a plurality of member printers into a user desired mode. When a capability notification designation of a group printer driver is received from an application, it is determined which is to be transmitted, a conflict result of a capability of a member printer, or a capability specific to a group printer driver, and a capability notification is transmitted depending on the determination result.

12 Claims, 22 Drawing Sheets

FIG. 13A

| CONFIGURATION OF MEMBER PRINTER | ITEMS WHICH CAN BE SET |
|---|---|
| INCLUDING DRIVER WHOSE FUNCTIONS CANNOT BE CONTROLLED | COMMON SETTING ITEMS |
| ONLY DRIVERS WHOSE FUNCTIONS CAN BE CONTROLLED | COMMON SETTING ITEMS + EXPANDED SETTING ITEMS |

FIG. 13B

| | SETTING ITEMS |
|---|---|
| COMMON SETTING ITEMS | LOGICAL PAPER SIZE<br>OUTPUT PAPER SIZE<br>USER DEFINED PAPER<br>PRINTING DIRECTION<br>MARGIN<br>MAGNIFICATION<br>NUMBER OF COPIES<br>SET UNIT (GROUP, COLLATE)<br>SORT (NON COLLATE)<br>PAGE LAYOUT<br>ARRANGEMENT ORDER<br>TWO-SIDED/ONE-SIDED<br>RESOLUTION<br>GRAY SCALE |
| EXPANDED SETTING ITEMS | ROTATION<br>WATERMARK<br>PAGE OPTION<br>BINDING DIRECTION<br>BINDING SPACE<br>STAPLE<br>STAPLE POSITION<br>SADDLE (PRINTING FOR BOOKS)<br>UPPER LIMIT OF NUMBER OF SHEETS FOR SADDLE |
| | METHOD OF PRINTING FOR BOOKS<br>OPENING DIRECTION<br>BINDING SPACE<br>LOWER LIMIT OF BINDING SPACE |
| | PUNCH<br>Z-FOLDING<br>4-PAGE POSTCARD<br>MIXED PAPER<br>INSERTER<br>PAPER FEED METHOD<br>PAPER FEED UNIT |

FIG. 13C

| FUNCTIONS | PRINTER DRIVER B | PRINTER DRIVER C | PRINTER DRIVER D | PRINTER DRIVER A |
|---|---|---|---|---|
| FUNCTION OF PRINTING FOR BOOKS | YES | NO | YES | NO |
| STAPLE FUNCTION | YES | YES | YES | YES |
| PUNCH FUNCTION | NO | NO | NO | NO |

EXAMPLE OF DISPLAYING GRAY-OUT SETTING ITEMS

EXAMPLE OF DISPLAYING NO SETTING ITEMS

PRINTING METHOD, PRINTING APPARATUS, PRINTING PROGRAM EXECUTABLE BY INFORMATION PROCESSING APPARATUS, AND COMPUTER-READABLE STORAGE MEDIUM STORING PROGRAM

BACKGROUND OF THE INVENTION

1. Field of the Invention

The present invention relates to a printing method, a printing apparatus, a printing program executable by an information processing apparatus, and a computer-readable storage medium storing a program for use in a printing utility for performing a printing process in response to a draw command from an application.

2. Related Background Art

Recently, network equipment has been widely used, and a number of personal computers (hereinafter referred to as a PC) and printers are connected in a network. When a printing process is performed in the above-mentioned network environment, a print job is temporarily spooled to distribute and output each page or copy on a plurality of printers for a document of a large number of pages or copies so that a printing time can be shortened, which is referred to as a distributed printing system.

In the above-mentioned network environment, there is a well-known system (color/monochrome distributed printing system) for distributing and outputting color pages to a color printer and monochrome pages to a monochrome printer for a document containing both color pages and monochrome pages so that the printing cost and the printing time can be reduced.

Furthermore, in the above-mentioned network environment, there is a system (broadcast printing system) for simultaneously transmitting and printing a document to a plurality of printers at one print instruction.

Additionally, in the above-mentioned network environment, there is a system (anti-error proxy printing system) for performing a printing process by automatically switching an erroneous printer into another printer for a document transmitted to one printer.

In the printing process performed on the above-mentioned plural printers (printer drivers), a virtual printer driver UI, etc. for defining various print settings for a plurality of printers (printer drivers) is well known.

In the printing systems in the above-mentioned network environments, there is a method in which one virtual printer (group printer) and related member printers are mounted in a client machine, and a group printer inquires about the capability of each member printer to control the UI.

Generally, an application obtains the capability of a printer driver selected as a printing target through the API defined by Windows (R). Especially, a DTP type application inquires of a printer driver selected as a printing target about printable paper size information (supported paper size) about the printer driver so that the paper size and the capabilities defined in the application according to the information can be restricted.

Furthermore, a printer driver normally notifies an application of predetermined capabilities in response to the capability inquiry from the application.

However, in response to an inquiry about a capability from an application, a virtual printer (group printer) has notified predetermined capabilities defined by a group printer driver. Therefore, the capabilities can be different from the actual capabilities depending on the configuration, and the capabilities cannot be informed according to the configuration depending on the configuration of a member printer. Especially, concerning the list of the supported paper size, the list of group printer determined paper sizes is different from the list of member printer paper sizes, and the paper size of the document generated in the application cannot match the paper size used in the output of the actual member printer. Additionally, since the paper size of the document does not match the paper size used in the actual output, an excess image area is output as an incomplete image.

On the other hand, it is not easy for a virtual printing utility such as a group printer driver to perform an arithmetic process on the capability depending on the configuration of a member printer, thereby causing the problem that the response of the display of a user interface for a print setting item of a virtual printer is delayed.

SUMMARY OF THE INVENTION

To attain the above-mentioned objects, the present invention provides a system for a group printer driver capable of controlling a plurality of member printer drivers, and can realize: a receiving step of receiving a capability notification designation of a group printer driver from an application; a determining step of determining whether a conflict result of the capability of a member printer is informed or a group printer driver determined capability is informed as a capability notifying method; an information collecting step of collecting information from each member printer when it is determined in the determining step that the conflict result of the member printer is to be informed; a conflict processing step of performing conflict processing on the collected information; a capability notifying step of notifying an application of the conflict result as a capability; and a notifying step of transmitting a predetermined capability notification when it is determined in the determining step that a predetermined capability is to be informed. Thus, the user interface capable of appropriately performing print settings on a virtual printer and the responsive virtual printer user interface can be appropriately switched, and an environment of a virtual printer according to a user request can be realized.

BRIEF DESCRIPTION OF THE DRAWINGS

FIGS. 13A, 13B and 13C show an example of the information used by a group printer driver;

DESCRIPTION OF THE PREFERRED EMBODIMENTS

First Embodiment

Preferred embodiments of the present invention are described below.

Figure 1:
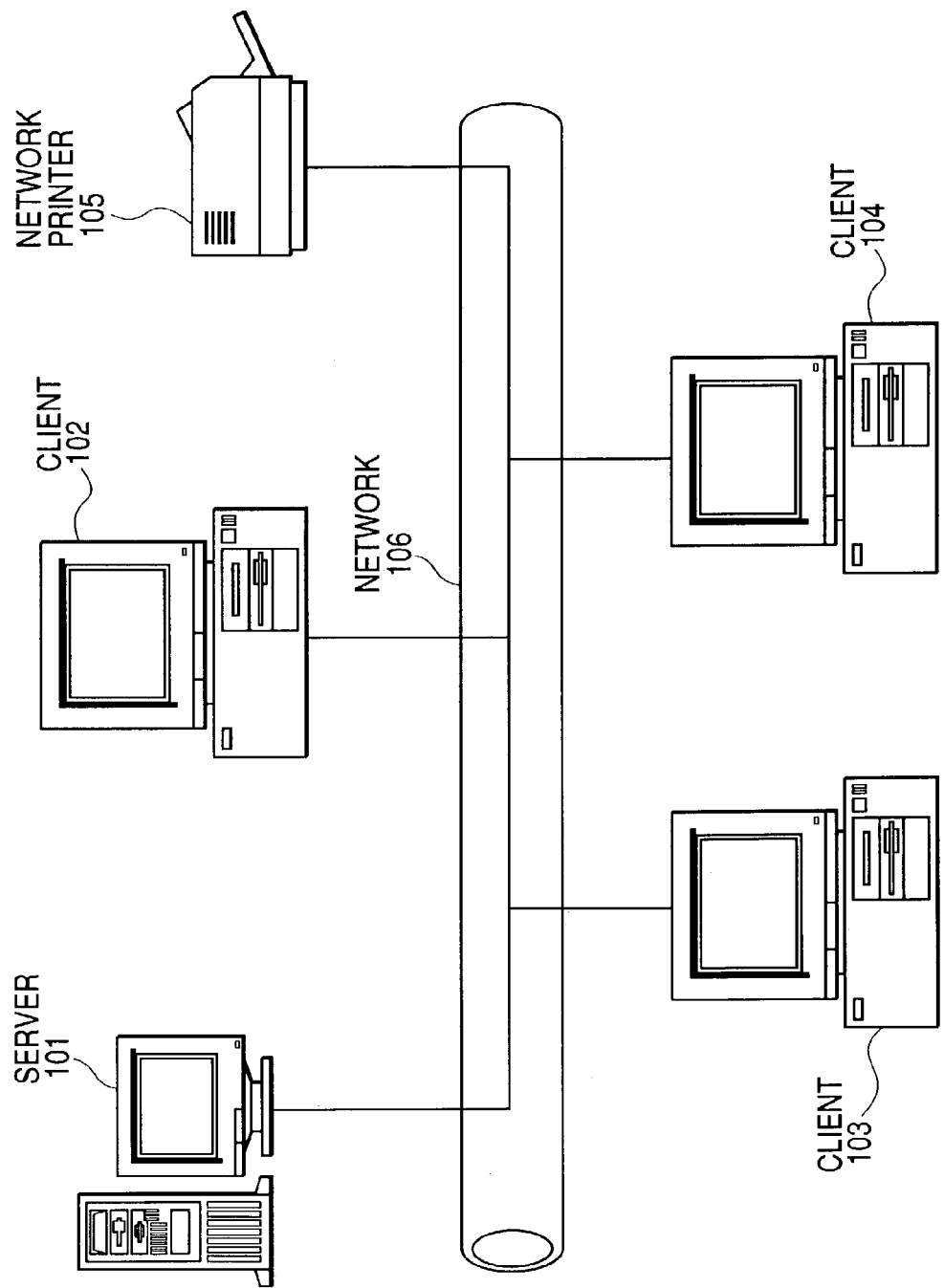
FIG. 1 is a block diagram of the configuration of the information processing system to which the present invention can be applied.

FIG. 1 is a block diagram of the outline of the configuration of the information processing system to which the present invention is applied. One or more client computers are assumed to be connected according to the present system.

In FIG. 1, reference numerals 102, 103, and 104 denote information processing apparatuses as client computers (clients), are connected to a network 106 through a network cable such as Ethernet (registered trademark), can execute various programs such as an application program, etc., and are loaded with a printer driver having the function of converting print data into a printer language corresponding to the printer. The printer driver is assumed to support a plurality of printer driver.

Reference numeral 101 denotes an information processing apparatus as a server (hereinafter referred to as a print server) according to the present embodiment, is connected to the network 106 through a network cable, accumulates a file used in the network, and monitors the use state of the network 106. The print server 101 manages a plurality of printers.

In the configuration, the client computers 102, 103, and 104 and the print server 101 are common information processing apparatuses, and the clients and the print server store executable print control programs for performing different types of control.

When the client computers 102, 103, and 104 issue a print request, the print server 101 in the present embodiment stores a print job including print data and performs a printing process, receives only the job information not including print data from the client computers 102, 103, and 104, manages the printing order of the client computers 102, 103, and 104, notifies the client at the current turn in the printing order of the permission of the transmission to the printer device of the print job including the print data, obtains the status of a network printer 105 and each piece of information about a print job, and notifies the client computers 102, 103, and 104 of the information.

The network printer 105 is a network-compatible printer which is a print control apparatus, is connected to the network 106 through a network interface not shown in the attached drawings, analyzes a print job including print data transmitted from a client computer or a print server, converts the data page by page into a dot image, and prints each page. The network 106 connects the client computers 102, 103, and 104, the server 101, the network printer 105, etc. for communications. It is obvious that a cable/wireless system can be realized.

Figure 2:
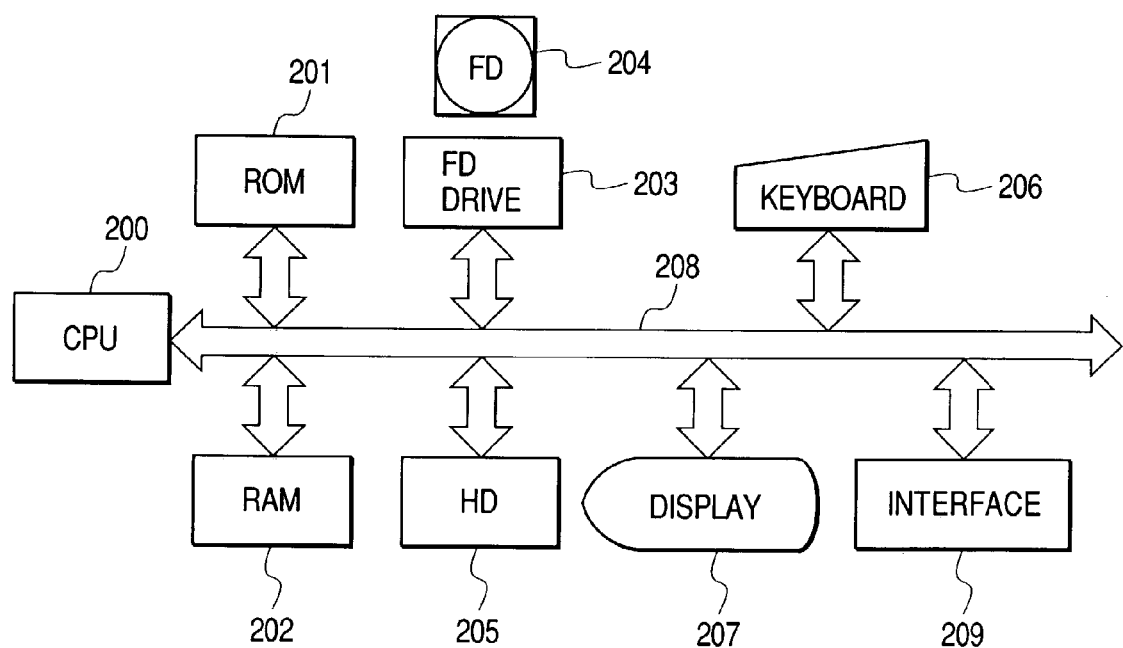
FIG. 2 is a block diagram of the configuration of the information processing apparatus according to the present invention.

FIG. 2 is a block diagram showing the configuration of the information processing apparatus according to the present invention, and the client computers 102, 103, and 104 which are information processing apparatuses have the same configuration. Furthermore, the print server 101 has the similar or the equivalent hardware configuration. Therefore, it is explained as a block diagram for explanation of the configuration of a client and a server.

In FIG. 2, a CPU 200 is control means of an information processing apparatus, executes an application program, a printer driver program, the OS, a network printer control program, etc. of the present invention stored on a hard disk (HD) 205, and controls temporary storage of the information, files, etc. required in executing the programs in the RAM 202.

ROM 201 is storage means and contains a program such as a basic I/O program, etc., and various data such as font data used in document processing, template data, etc. The RAM 202 is temporary storage means, and functions as a main memory, a work area, etc. of the CPU 200.

Figure 5:
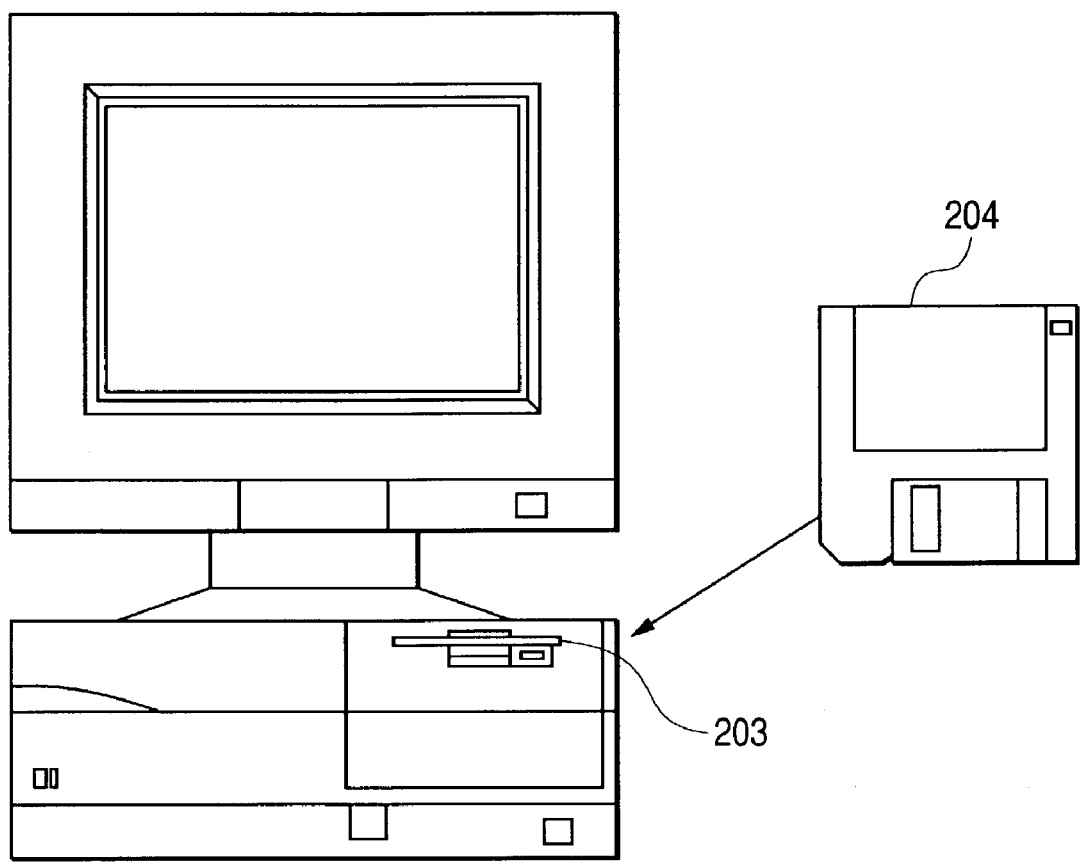
FIG. 5 shows the association with the FD 204 inserted into an FD drive 203 shown in FIG. 2.

The FD drive 203 is a floppy (registered trademark) disk (FD) drive, and can load the computer system with the programs stored on the FD 204 as a storage medium through the FD drive 203 as shown in FIG. 5 described below. The storage medium is not limited to an FD, and can arbitrarily be CD-ROM, CD-R, CD-RW, a PC card, a DVD, an IC memory card, an MO, a memory stick, etc.

The FD 204 is a floppy (R) disk (FD) which is a computer-readable storage medium storing a program.

The HD 205 is one of external storage means, and a hard disk (HD) functioning as large-capacity memory, and stores an application program, a printer driver program, the OS, a network printer control program, a related program, etc. Furthermore, a spooler which is spool means is stored on the hard disk. The spool means is a client spooler on the client side, and a server spooler in the print server. The print server stores job information received from a client, and a table for order control is also generated and stored by the external storage means.

A keyboard 206 is designation input means, and is used by a user in inputting and designating an instruction using a control command of a device.

A display 207 is display means, and displays a command input from the keyboard 206, the state of a printer, etc.

A system bus 208 is a system bus through which the data in the computer of a client and a print server.

An interface 209 is input/output means, and an information processing apparatus communicates data with an external device through the interface 209.

Figure 3:
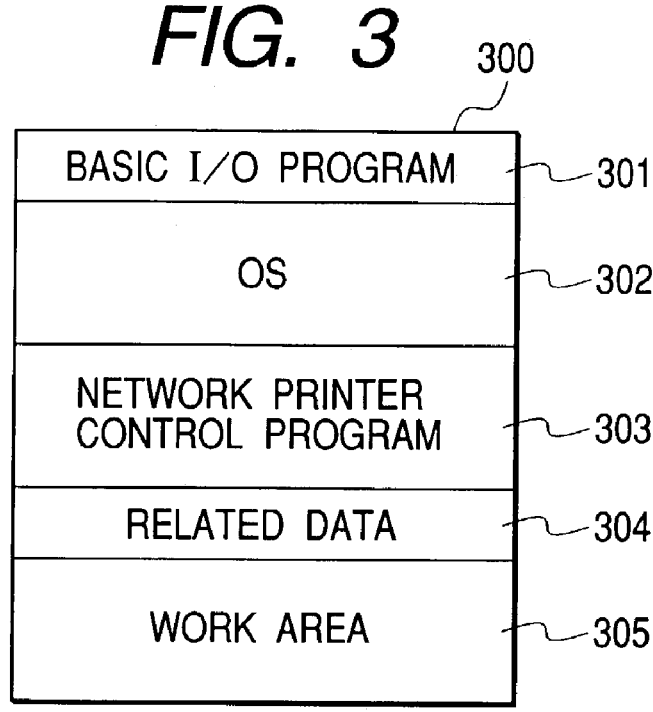
FIG. 3 shows an example of a memory map of RAM 202 shown in FIG. 2.

FIG. 3 shows an example of a memory map of the RAM 202 shown in FIG. 2, and a memory map showing the executable network printer control program described above loaded from the FD 204.

According to the present embodiment, a network printer control program and the related data are loaded directly into the RAM 202 from the FD 204 and are executed. It is also possible to load an already installed network printer control program in the HD 205 into the RAM 202 each time the network printer control program is operated.

A medium for storing the network printer control program can be CD-ROM, CD-R, a PC card, a DVD, and an IC memory card in addition to an FD. Furthermore, the network printer control program can be stored in the ROM 201 as a part of a memory map, and can be executed directly by the CPU 200.

Furthermore, the software for realizing the function of the above-mentioned devices can replace the hardware devices.

The network printer control program can be referred to simply as a print control program. The print control program includes a program for control of the designation to change a printing destination of a print job in a client or to change the printing order, and also includes a program for controlling the printing order of a print job in a print server, for notification of an end of printing, a printing destination change request, etc. of a print job. The print control program of the present invention for the above-mentioned control can be divided into a module installed in a client and a module installed in a print server, or a print control program can be operated for a client depending on the environment of the execution, or can be operated for a print server. Otherwise, a module having the functions for a client and a module having the functions for a print server are installed together into a computer so that they can be concurrently operated simultaneously or in a time-division manner.

A basic I/O program 301 is an area containing a program having an IPL (initial program loading) capability of reading the OS from the HD 205 to the RAM 202 when the control device is turned on, and starting the operation of the OS.

Reference numeral 302 denotes an operating system (OS). A network printer control program 303 is stored in an area reserved in the RAM 202. Related data 304 is stored in an area reserved in the RAM 202. A work area 305 reserves an area in which the CPU 200 executes the print control program.

Figure 4:
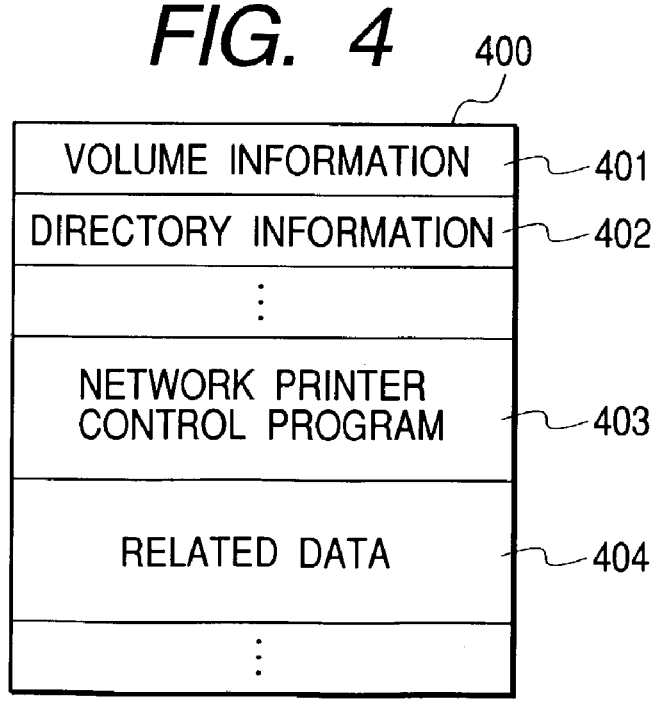
FIG. 4 shows an example of a memory map of an FD 204 shown in FIG. 2.

FIG. 4 shows an example of a memory map of the FD 204 shown in FIG. 2. In FIG. 4, reference numeral 400 denotes data contents of the FD 204, volume information 401 indicates the information about data, reference numeral 402 denotes directory information, a network printer control program 403 described in the present embodiment is a print control program, and reference numeral 404 denotes the related data. The network printer control program 403 is a program generated according to the flowchart described in an embodiment of the present invention. In the present embodiment, a client and a server have the same configurations.

FIG. 5 shows the association with the FD 204 inserted into the FD drive 203 shown in FIG. 2, and the units also shown in FIG. 2 are assigned the same reference numerals. In FIG. 5, the FD 204 stores the network printer control program described in the present embodiment, and the related data.

Described below is a print job control system for performing the above-mentioned distributed, broadcast, and proxy printing processes using a plurality of printers according to the present embodiment.

Figure 6:
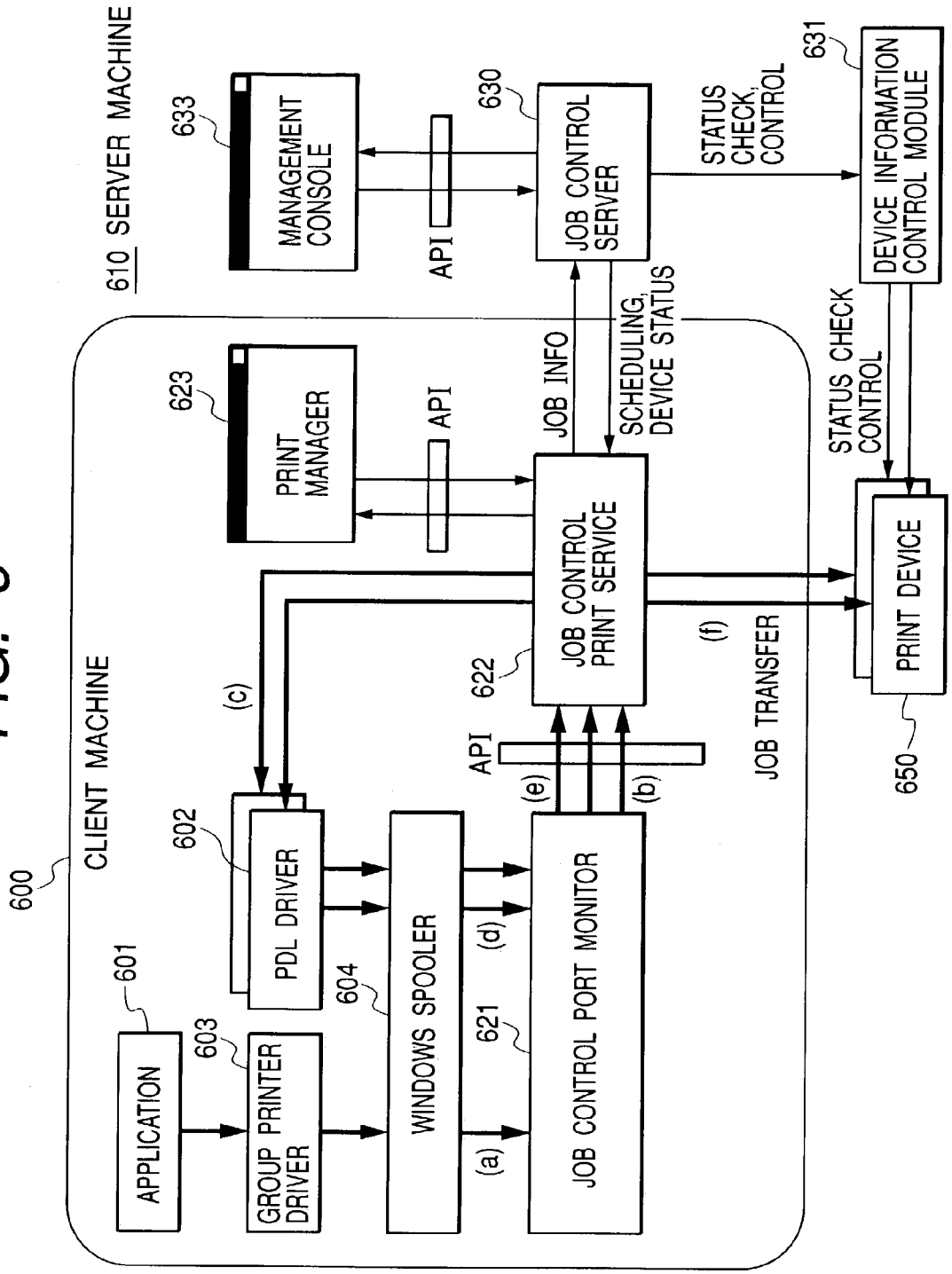
FIG. 6 is a block diagram of the configuration of the print control module of the information processing apparatus according to the present invention.

FIG. 6 shows the process of the print job issued by a general application such as Microsoft Word (registered trademark) performed by the print job control system of the present system. In FIG. 6, a client machine 600 operates a client module of the print job control system.

Normally, an application program generates a series of draw instructions when printing is designated, and the generated draw instructions are transmitted to Windows (R) Spooler through the printer driver. Windows (R) Spooler transmits the print job data to a port monitor selected by the user for transmission to a printer device.

In the present embodiment, the user specifies a job control port monitor 621 for a print job control system (hereinafter referred to as a job control monitor for short) in advance to designate printing. An application 601 generates data for constructing a general-purpose print file described in detail by referring to FIG. 8 if input data has not been generated as a general-purpose print file. The case where the data already generated as a general-purpose print file from the application 601 at a print designation is entered into the Window Spooler is described later in detail (by referring to FIGS. 11 to 14). A group printer driver 603 which has received the draw instruction generates document data in a general-purpose format (characters, graphics, photographic images, etc.), and outputs the data to Windows (R) Spooler 604. Windows (R) Spooler 604 transmits the received print job data to the job control port monitor 621, not to a normal port monitor. The job control port monitor 621 transmits print job data to a print service 622 for a print job control system (hereinafter referred to as a job control print service for short in the present embodiment), not to a printer device 650. Then it is lead as a job to the job control print service 622 (b) through the job control port monitor 621 (a). In response to the print job, the job control print service 622 generates a general-purpose print file, generates a draw instruction based on the general-purpose print file through the OS (c), and then each PDL driver 602 constructs the draw instruction as a PDL (page description language) file interpretable by the printer device 650. FIG. 6 shows an example of performing job control (distributed printing control) by the job control print service 622 dividing a print job into two portions, and an example of generating two member jobs indicated by two arrows (c). The PDL file generated by the PDL driver 602 is transmitted to the job control print service 622 (e) again through Windows (R) Spooler 604 and the job control port monitor 621 (d). The job control print service 622 transmits the print job data of the PDL to the printer device 650 (f) according to the transmission permission notification of a job control server 630. The job control print service 622 logically divides one general-purpose print file into a plurality of print jobs at an instruction of the print designation (corresponding to a print designation portion 10-*a*) in the generated general-purpose print file, transmits each job portion to a different printer device, and re-transmits the once transmitted print job data to another printer device. (c), (d), (e), and (f) in the figures indicate the paths of the print job data in the processes.

Described below are the technological meanings of the terms according to the present embodiment. That is, a virtual printer which virtually binds a plurality of printers as one printer is referred to as a group printer, and printers to be bound are referred to as member printers. The printer drivers corresponding to the group printer and member printers are respectively referred to as a group printer driver and a member printer driver.

The group printer (group printer driver) and the member printer (member printer driver) are furthermore practically defined as follows. That is, a virtual driver (print utility) for generating data for generation of an intermediate format file (general-purpose print file) based on a draw instruction generated from an appropriate through the OS is referred to as a group printer driver. When the job control print service 622 issues print designation to each printer to generate a page description language based on the above-mentioned intermediate format file, each printer is referred to as a member printer.

In the present embodiment, the printer driver for interpreting the draw instruction (normally referred to as a DDI or a GDI) output through the OS such as Windows (registered trademark), etc. according to a print designation in an application or EMF (enhanced metafile format), and generating and outputting the page description language to a device is normally referred to as a printer driver, and the device is normally referred to as a device so that they can be distinguished from a group printer and a member printer. To distinguish a printer which is a device, a combination of a printer driver and a printer output port can also be referred to as a printer. For example, specifying a combination of the logical port shown in FIG. 7 (job control port monitor 621) and described later and a group printer driver can also be referred to as specifying a group printer.

Back in FIG. 6, a print manager 623 for a print job control system (hereinafter referred to as a job control print manager 623 for short) is a program for providing a user interface (UI) for checking the status of a print job in the job control print service 622, and operating a print job. The job control print manager 623 communicates information and instructions with the job control print service 622 through the interface (API) of software.

The server 630 for a print job control system (hereinafter referred to as a job control server) centrally controls (schedules) the timing of the job control print service 622 of each client machine 600 transmitting print job data to the printer device 650.

A management console 633 for a print job control system (hereinafter referred to as a job control management console for short) communicates information and instructions with the job control server 630 through the API for access of the software of the job control server 630, thereby monitoring the entire print job control system. Furthermore, the job control server 630 communicates data with each printer device 650 using a device information control module 631, obtains information about a print job and an operation status in each printer, and performs an operation. The obtained information can be transmitted to the job control print service 622 of the client machine 600.

Figure 7:
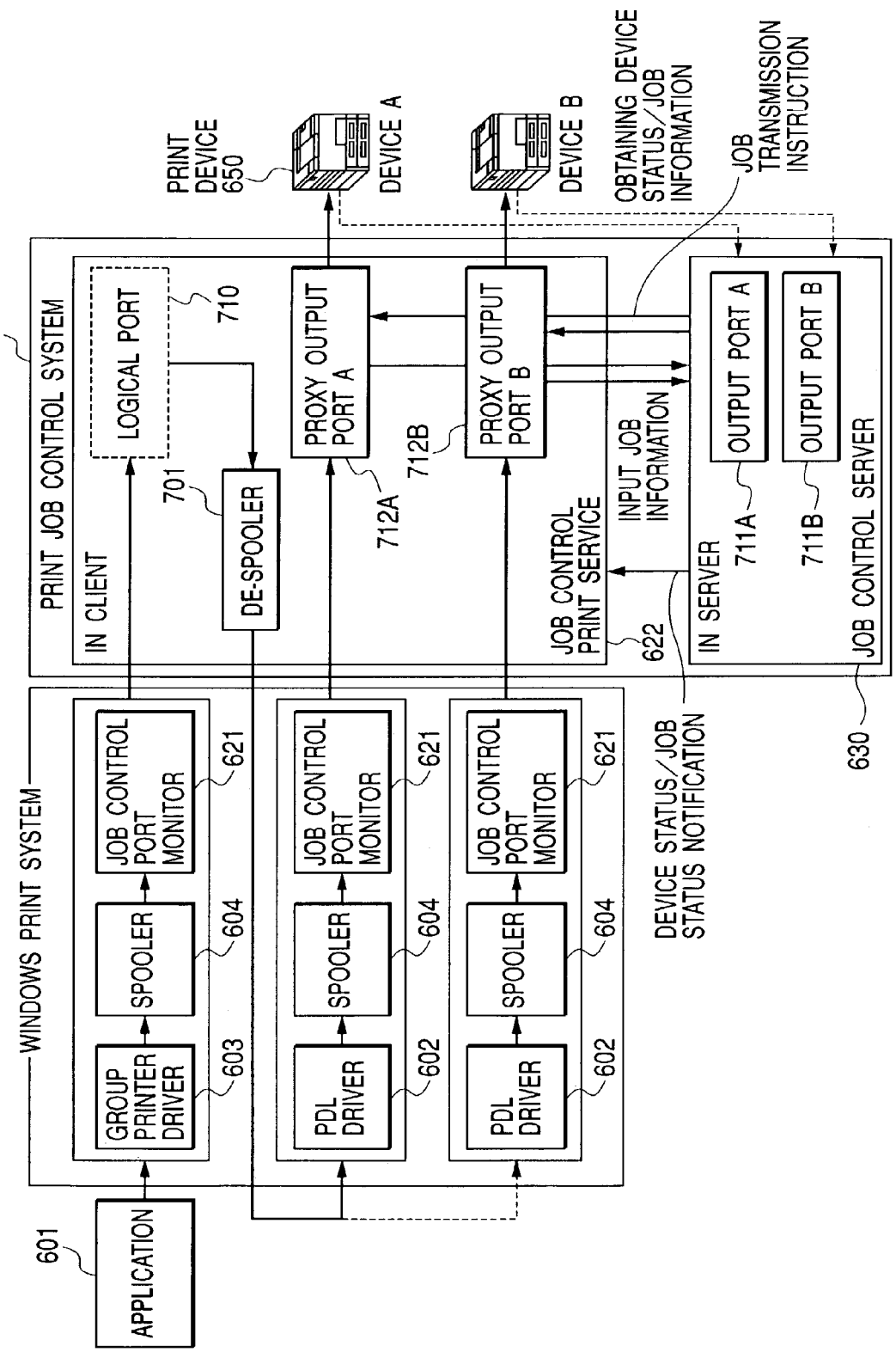
FIG. 7 shows an example of the data structure of the job information managed by a print server.

The process and the relationship between the print system provided by Windows (R) as shown in FIG. 7 and the print job in the print job control system is described below furthermore in detail.

In FIG. 7, a print job control system 700 shows the range of the print job control system covering the physical machine in which the control programs of the server and the client are operated. Furthermore, an output port 711 managed by a server is associated with a proxy output port 712 of the job control print service 622 of the client, and integrally manages all proxy output ports in each client associated with one port. In the present embodiment, an actual print job data is held in the proxy output port 712 of each client. The job control server 630 does not perform a transmitting process on the print job data, but only performs transmit designation of a print job for the job control print service 622. In response to the designation, the job control print service 622 of the client transmits the print job data to the printer device 650.

Described below is the printing process in which a plurality of printers are operated for proxy printing, distributed printing, broadcast printing, etc. in the print job control system 700.

When the print job control system 700 performs value-added printing such as proxy printing, distributed printing, broadcast printing, etc., the application 601 has to issue a print job to a printer to which the group printer driver 603 is assigned. The job control print service 622 receives job data processed by the group printer driver 603 together with the general-purpose format document data and print designation information through the job control port monitor 621 as a series of job data. A logical port 710 shown in FIG. 7 indicates a port through which a job is received. The job control print service 622 receives data in a packet received by the logical port 710, and passes it to a general-purpose print file generation unit 702. The general-purpose print file generation unit reconstructs the received data into the format of the general-purpose print file 703, and performs the process of writing the data as a general-purpose print file 703.

Then, a de-spooler 701 reads the general-purpose print file 703, issues a job (member job) to another printer (printer driver to which a PDL driver is assigned so that a printing process can be performed. At this time, the de-spooler 701 interprets the print designation portion 10-*a* described by referring to FIG. 10 and to be described later further in detail, processes the document data of the document data portion 10-*b* based on the interpretation, converts the data into a predetermined draw instruction (corresponding to a GDI in case of Windows (R), issues print designation to each printer driver, and issues a print job. For example, when the print format designation portion (FIG. 10) has a record of 2-UP designation, the document data of 2 pages is reduced and laid out over a page. When distributed printing or broadcast printing are recorded in the output method designation portion, a job is issued to a plurality of member printers described in the print designation portion 10-*a* depending on the settings. If it is determined that a proxy condition is satisfied in the case of the proxy printing, then re-job is issued to a proxy printer depending on the settings of a proxy printer recorded in the print designation portion 10-*a* in advance in the automatic proxy, and depending on the operation of a user in the manual proxy.

When the de-spooler 701 issues a job to each member printer, it is necessary to generate DEVMODE of racy member printer as the print designation corresponding to a member printer driver, but the DEVMODE is generated by reflecting the contents described in the print designation portion 10-*a* appropriately by the DEVMODE of each member printer. The DEVMODE is described furthermore in detail below. That is, a normal printer driver extracts basic setting information (for example, the number of copies and the possibility information about two-sided printing) required in a normal printing process from an area referred to as a common area (public DEVMODE) of driver setting information. The information set in the area is prescribed such that a setting item can be read and written by a different printer vendor. On the other hand, as a function specific to each printer, for example, a staple function, a punch function, a function of printing for books, etc. are stored in an extended area (extended DEVMODE) of driver setting information, and the setting information about the area is different in a format depending on the printer vendor.

The job control print service 622 of the client receives the PDL data of each member job rendered by the PDL driver 602 through the job control port monitor 621, notifies the server of the information about the received job, and temporarily stores the job data in its proxy output queue (Proxy Output Port) 712. Then, after receiving the transmit designation from the job control server 630, it is transmitted to the printer device 650.

In FIGS. 6 and 7, the description is made that the transmission of a print job to a printer device is controlled by the job control server 630 issuing a transmission permission to a client. However, printer driver (PDL) can be transmitted directly from a client by assigning an IP address of a printer device to each member printer driver Furthermore, the application 601 shown in FIG. 7 and a block containing the group printer driver 603 (excluding a block containing PDLDriver) are provided in a client, and the functions of each of the other blocks are provided in a print server set physically independent of the client. Supplementary explanation is given below relating to the settings of the above-mentioned group printer. In the present embodiment, a plurality of group printer driver set in advance are selected and held in an available format. The settings of the group printer driver include at least the settings for associating a plurality of member printers with group printer driver names, the settings for associating the output method (distributed printing, proxy printing, etc.) corresponding to a group printer driver, and the settings of print format designation information such as default print resolution, paper size, N-UP layout, etc. Each of the settings is performed through a user interface, and each of the set group printers is provided as a probable to be selected.

Described below is the process of the group printer driver 603 performed when a normal draw instruction (DDI: device driver interface) is entered through the OS from the application 601.

Figure 8:
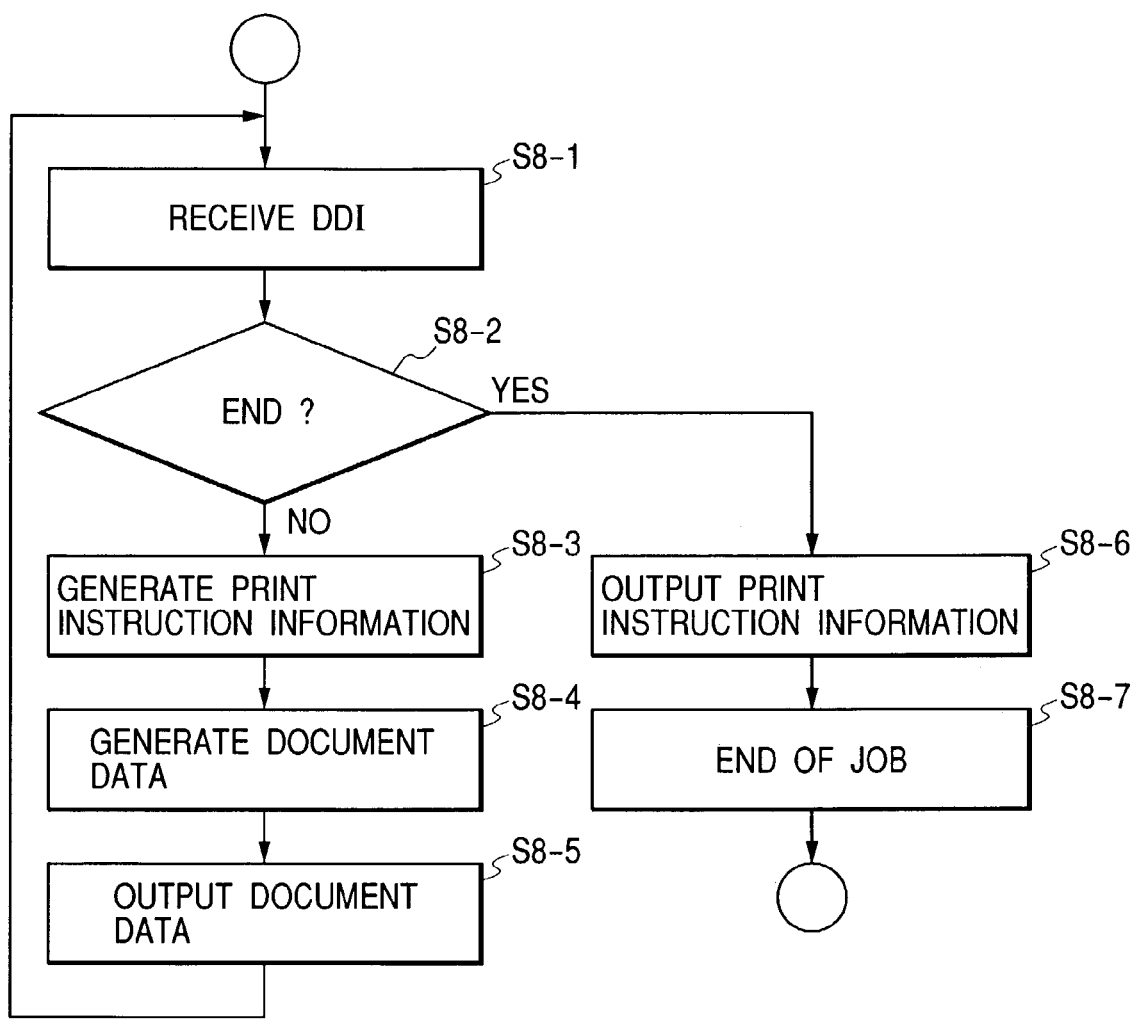
FIG. 8 shows the flow of the process of a group printer driver.

FIG. 8 shows the flow of outputting data from the group printer driver 603 in FIGS. 6 and 7 to Windows (R) Spooler 604 in response to the draw instruction issued from the application 601 through the OS.

First, in step S8-1, a series of draw commands DDI issued by the application 601 through the OS are sequentially received.

Then, control is passed to step S8-2, and it is determined whether or not the command received in step S8-1 is an end of drawing command.

If it is determined in step S8-2 that it is not the end of drawings, then control is passed to step S8-3, and the data of the print designation information is read and generated from the command. The print designation information is grouped as a draw command in the present embodiment, but includes the settings of the UI such as paper size, layout information, staple information, etc.

Then, control is passed to step S8-4, and the draw command received in step S8-1 is converted into document data in the general-purpose format. In this embodiment, a draw command can correspond to one piece of document data, and a plurality of draw commands can be temporarily cached as collective document data.

Then, in step S8-5, the document data generated in step S8-4 in the general-purpose format is put in a packet in Windows (R) Spooler 604 and output.

Then, control is returned to step S8-1, and a draw command of an application is received again. If it is determined in step S8-2 that it is the end of drawings, control is passed to step S8-6, and the print designation information generated in step S8-3 is output.

Then, control is passed to step S8-7, and a job terminate instruction indicating that the output is completed is output, thereby terminating the process.

Figure 10:
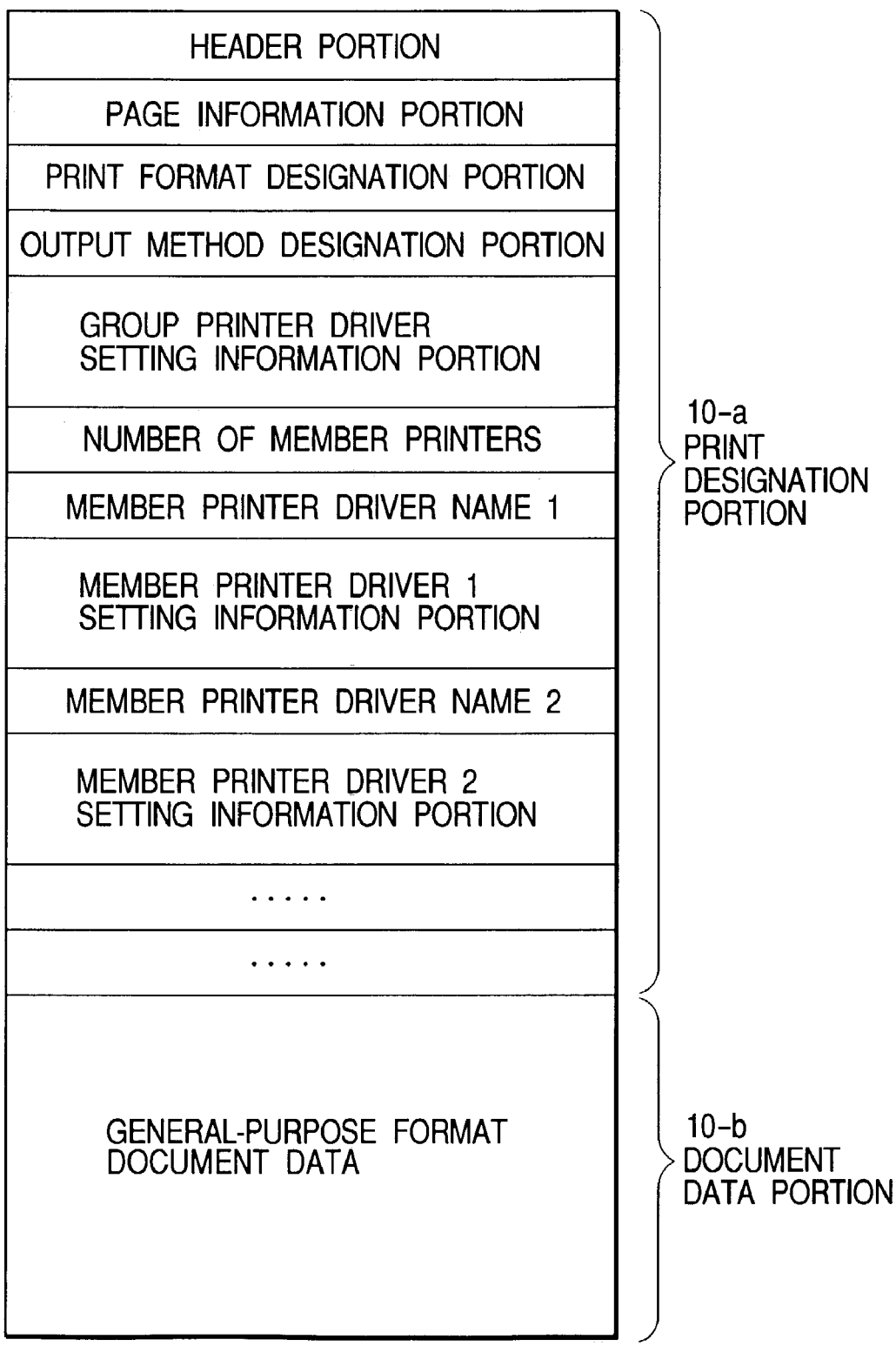
FIG. 10 shows the structure of a general-purpose print file.

Thus, by following the flowchart shown in FIG. 8, the process of putting the information about a draw instruction, paper size, etc. in a packet at any time is performed, and the document data is arbitrarily output to the spooler, and the print designation information (corresponding to the data based on the print designation portion 10-*a* shown in FIG. 10) is collectively output after outputting document data. Thus, the data for generation of a general-purpose print file by a group printer driver is generated, and the load of the general-purpose print file generation unit 702 described above-mentioned by referring to FIG. 7 can be reduced.

Figure 9:
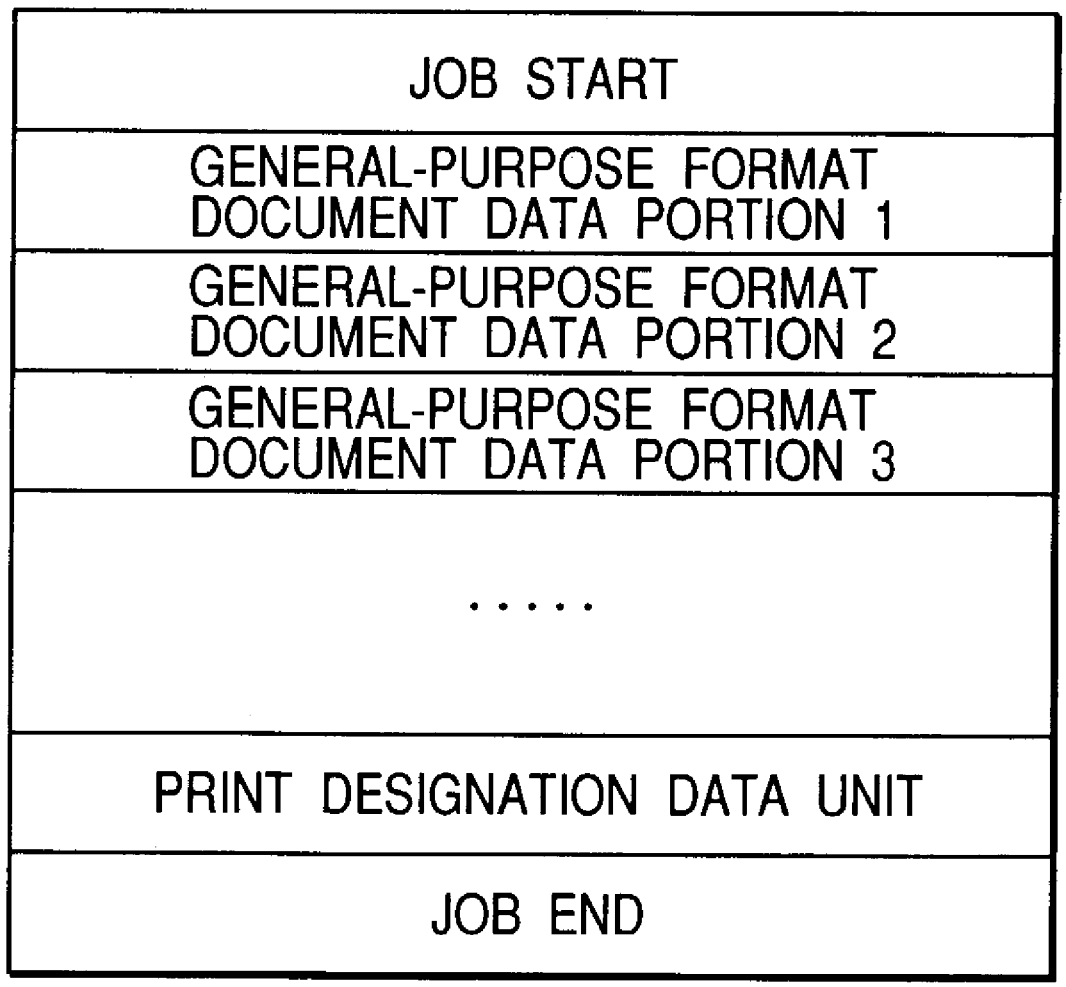
FIG. 9 shows the structure of a print job.

FIG. 9 shows a type of data obtained by a series of output shown in FIG. 8 and put in a packet.

First, a series of output data is encompassed by the packets which are output of Job Start indicating the start of the job and Job End indicating the end of the job. The document data portions 1, 2, 3, . . . in the general-purpose format indicate that the document data in the general-purpose format, output in step S8-5 are configured as a series of packet data. The print designation data portion is indicated as one packet in FIG. 9, but, like document data, can be divided and transmitted in a plurality of packets.

The series of data output in packets is led to the job control print service 622 (b) as a job from Windows (R) Spooler 604 through the job control port monitor 621 (a) as described above.

The job control print service 622 constructs a general-purpose print file for the transmitted data, generates a draw command based on the general-purpose print file (c), and each PDL driver 602 generates a PDL file interpretable by the printer device 650 from the draw command.

FIG. 10 shows an example of the configuration of the general-purpose print file as described above.

The general-purpose print file used in the present embodiment is configured by the print designation portion 10-*a* and the document data portion 10-*b*.

The print designation portion describes the information about documents and print designation, and corresponds to the structure (generated) according to the information output in step S8-5 and S8-6 shown in FIG. 8. The document data is obtained by converting application document data into the data in the general-purpose format, and is independent of a printer language. The format after the conversion is not specified so far as the data in a page unit can be represented in a detailed format. In the actual standard format, for example, the EMF (enhanced metafile format) in the Windows (R) system, the SVG format, etc. can be adopted as a general-purpose print document format.

The print designation portion is configured by a header portion, a page information portion, a print format designation portion, an output method designation portion, a group printer driver setting information portion, the number of member printers, a member printer driver name, a member printer driver setting information portion, etc.

The header portion stores information such as a version identifier of the present file, file information, etc.

A page information portion stores information such as the number of pages of document data of the document data portion 8-*b*, the size of each page, etc.

The print format designation portion stores information about output format such as the range of print page (corresponding to a margin), the number of copies, the layout information about document data (N-UP, printing for books, etc.), staple designation, punch designation, etc.

The output method designation portion stores information about distributed printing, color/monochrome distributed printing, proxy printing, broadcast printing, etc. as output methods.

The group printer driver setting information portion stores setting information set through group printer driver setting UI. A plurality of group printers can be set for each output method or corresponding to a combination of member printers, and a group printer specified through a pointing device from among a plurality of set group printers can be set as being included in the group printer driver setting information portion of the print designation portion 10-*a*.

The number of member printers stores the number of member printers associated by the group printer driver.

The group printer driver name stores the printer driver name of a member printer.

The member printer driver setting information portion stores, for example, DEVMODE information as setting information set through the driver UI corresponding to the member printer. Each output port and device IP address are included. The setting information set through the driver UI can correspond to the setting information changed by opening the driver UI corresponding to each member printer driver after print settings common to each member printer are conducted through the group printer driver UI.

The member printer driver name and the member printer driver setting information portion have storage areas equal in number to the number of the above-mentioned member printers.

The present file can be used as a different file between the print designation portion 10-*a* and the document data portion 10-*b*. In this case, the print designation portion is used as a print designation file, and the document data portion can be used as a document data file, and can be managed as one file in an archive format.

Figure 11:
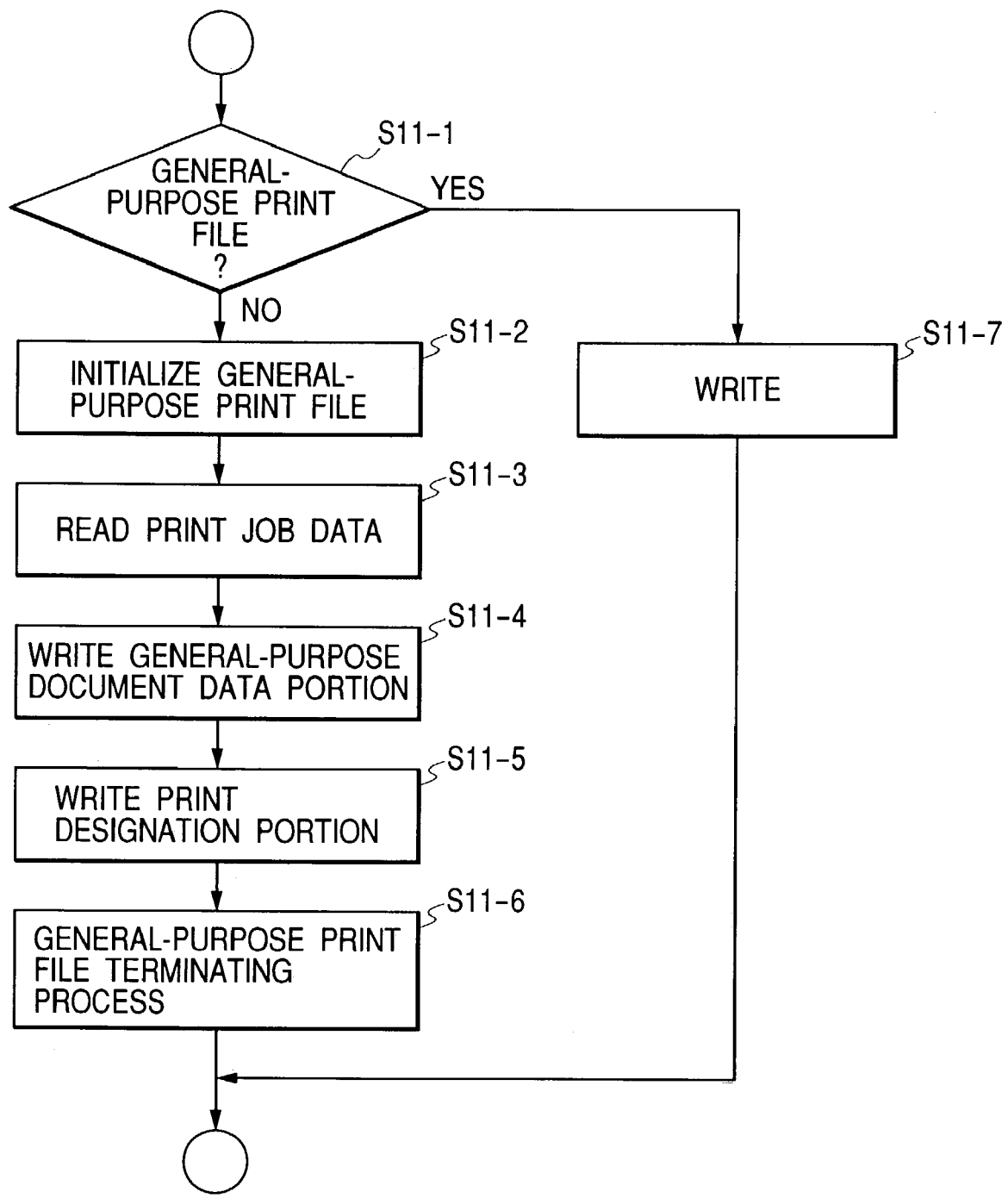
FIG. 11 is a flowchart of a general-purpose print file generation unit.

The generation of a general-purpose print file according to the present embodiment is explained by referring to FIG. 11.

FIG. 11 shows the flow of generating the general-purpose print file 703 by the general-purpose print file generation unit 702 shown in FIG. 7.

First, in step S11-1, it is determined whether or not the data received by the logical port 710 shown in FIG. 7 is a general-purpose print file. If it is determined that the data refers to a general-purpose print file, it indicates that a general-purpose print file has been generated by the application 601. If the data received in step S11-1 refers to a general-purpose print file, then control is passed to step S11-7, and the format of the received data is written as a general-purpose print file, thereby terminating the process.

If the data received in step S11-1 is not the format of a general-purpose print file, then control is passed to step S11-2, and the initializing step of generating a general-purpose print file is performed.

Then, control is passed to step S11-3, the received print job data is read and interpreted, and converted into a general-purpose print data format. The received print job data comprises a series of document data portions in the general-purpose format and a print designation information portion described above by referring to FIG. 9.

Then, control is passed to step S11-5, and data is written as a general-purpose print file.

Then, control is passed to step S11-6, and the termination processing is performed on the general-purpose print file, and the procedure of reading the general-purpose print file to the de-spooler 701 described above by referring to FIG. 7, thereby terminating the process.

Described below is the UI control of a printer driver for the print job control system for performing a printing process such as the above-mentioned distributed printing, broadcast printing, proxy printing, etc. using a plurality of printers each having a printer driver including a storage area such as a common setting area, an extended setting area, etc. according to the present embodiment.

Figure 12:
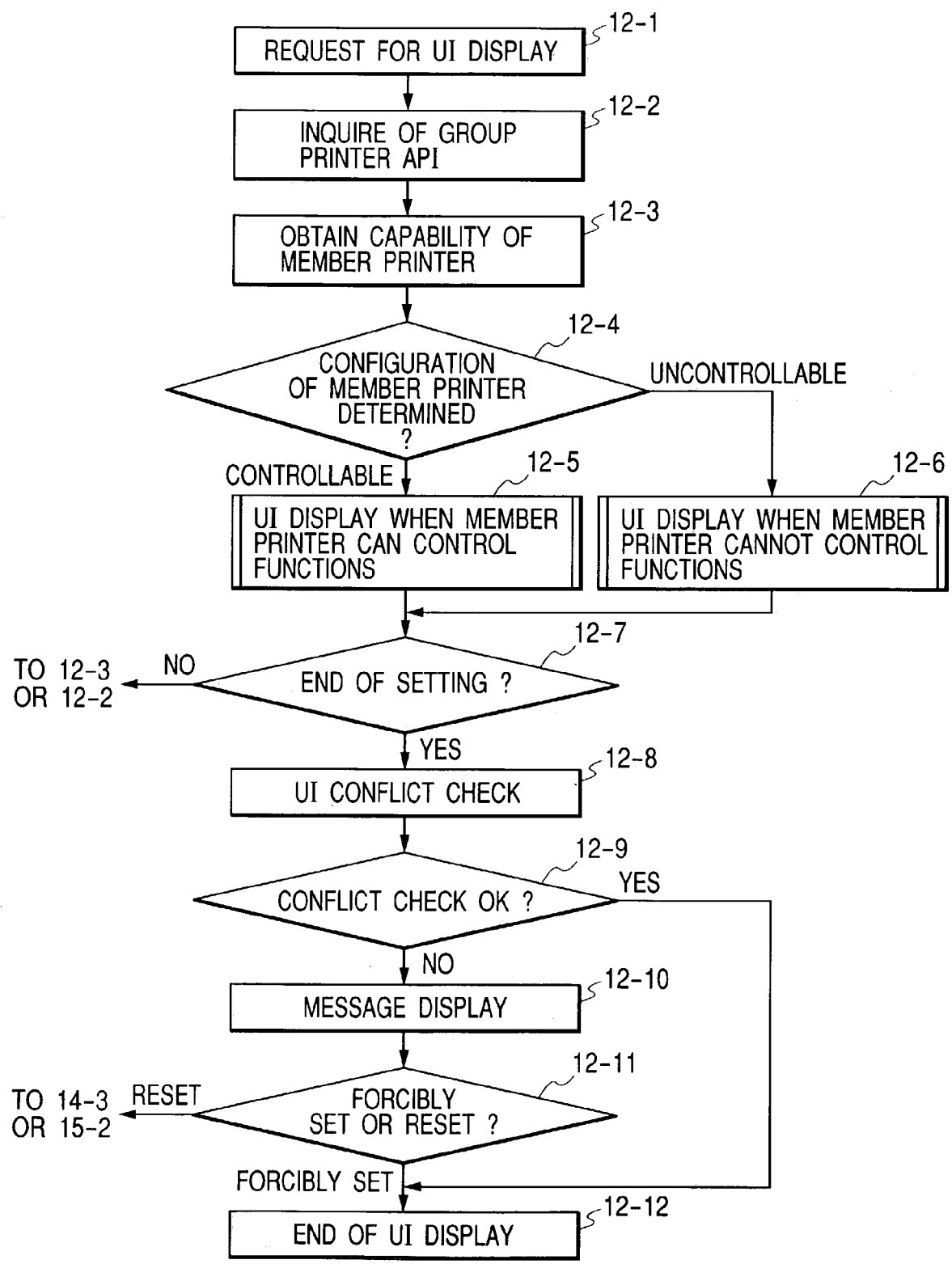
FIG. 12 is a group member printer driver UI display basic flowchart.

FIG. 12 is a flowchart showing the UI control flow of the group printer driver according to the present invention.

When a UI display request is issued from an application to a group printer driver, control is passed to step S12-1.

Step S12-2 is a step of inquiring about the identifier ID of all member printer drivers configuring the group printer driver using the print job control system API, and obtaining the identifiers ID of all member printer drivers configuring the group printer.

Step S12-3 is a step of obtaining the function of the member printer driver from the identifier ID of each member printer driver obtained in step S12-2, and reading whether each of all member printer drivers configuring the group printer is a "function-controllable driver" whose driver function can be collected up to the portion of the extended area of the driver setting information, or a "function-uncontrollable driver".

Figure 17A:
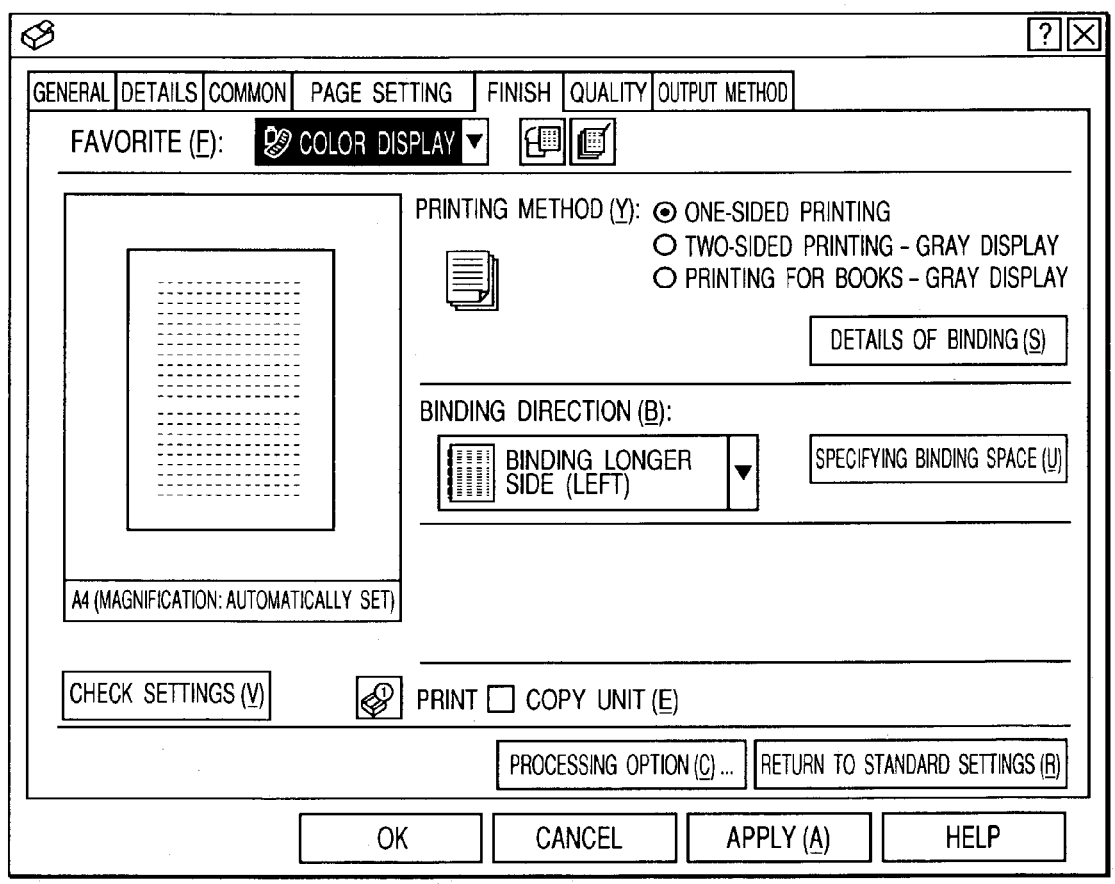
FIGS. 17A and 17B show an example of UI control.
Figure 17B:
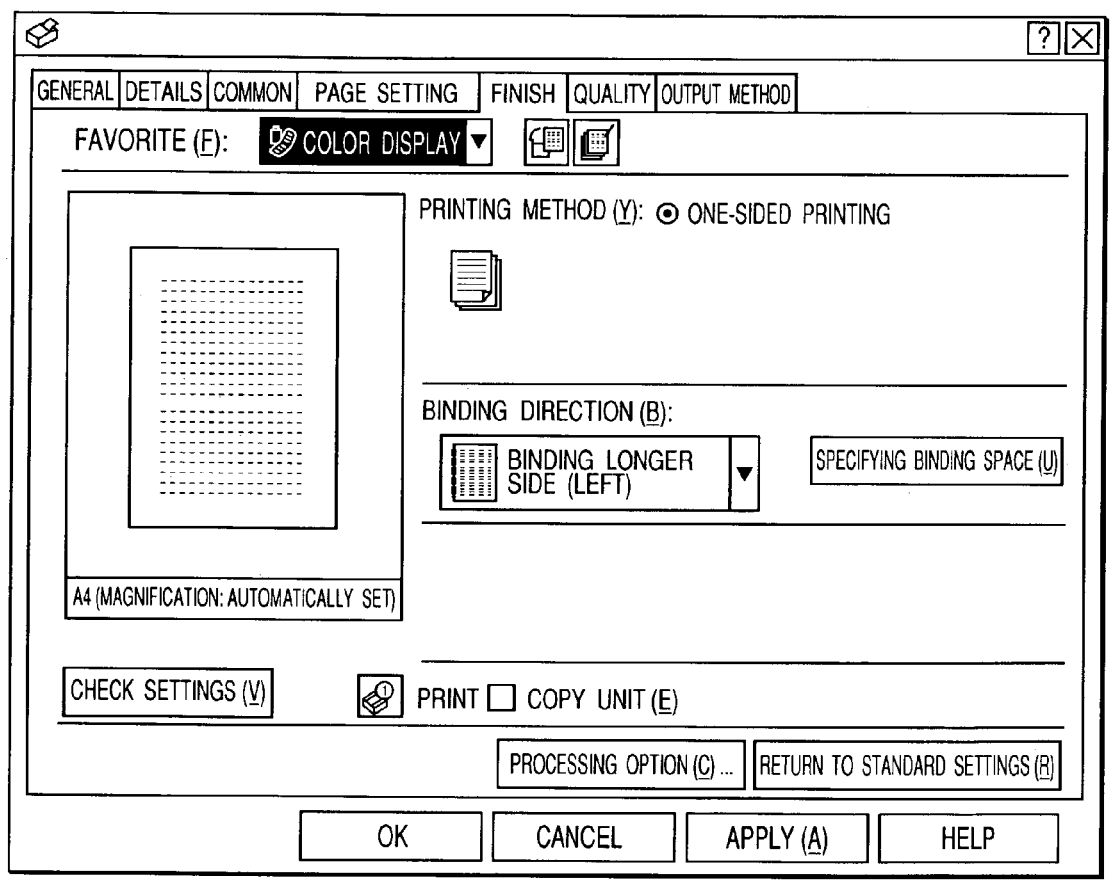

The function-controllability/uncontrollability is described furthermore in detail. Relating to a function-controllable driver, for example, a printer driver capable of designating print setting (for example, a binding space for books) which is an extended setting item from the job control print service 622 (software module) in FIG. 7, performing gray-out display control of a predetermined setting item as shown in FIGS. 17A and 17B, etc. is referred to as a function-controllable member printer, and a printer driver not capable of the above-mentioned processes is referred to as a function-uncontrollable member printer. Practically, to set an extended setting item of a printer driver and display-control a gray-out display, it is necessary to know the SDK (Software Development Kit) developed for control of a printer driver, and a function cannot be controlled when the SDK of a printer driver to be controlled is not known.

Step S12-4 is a step of determining the configuration of a member printer according to the information about function controllability/uncontrollability read in the above-mentioned step. When it is configured by "function-controllable drivers" only, control is passed to step S12-5. With the other configurations, control is passed to step S12-6.

FIG. 13A shows correspondence between the configuration of the member printer according to the present invention and an extended setting item. FIG. 13B shows the correspondence between a common setting item and an extended setting item.

In the present patent, a common setting item sorted and prescribed as existing in a common setting area, and an extended setting item is sorted and prescribed as existing in an extended setting area. However, depending on the OS operating the print job control system, setting items are differently sorted, or setting enabled items are changed, but it is obvious that the UI control flow of the present patent is effective.

Figure 14:
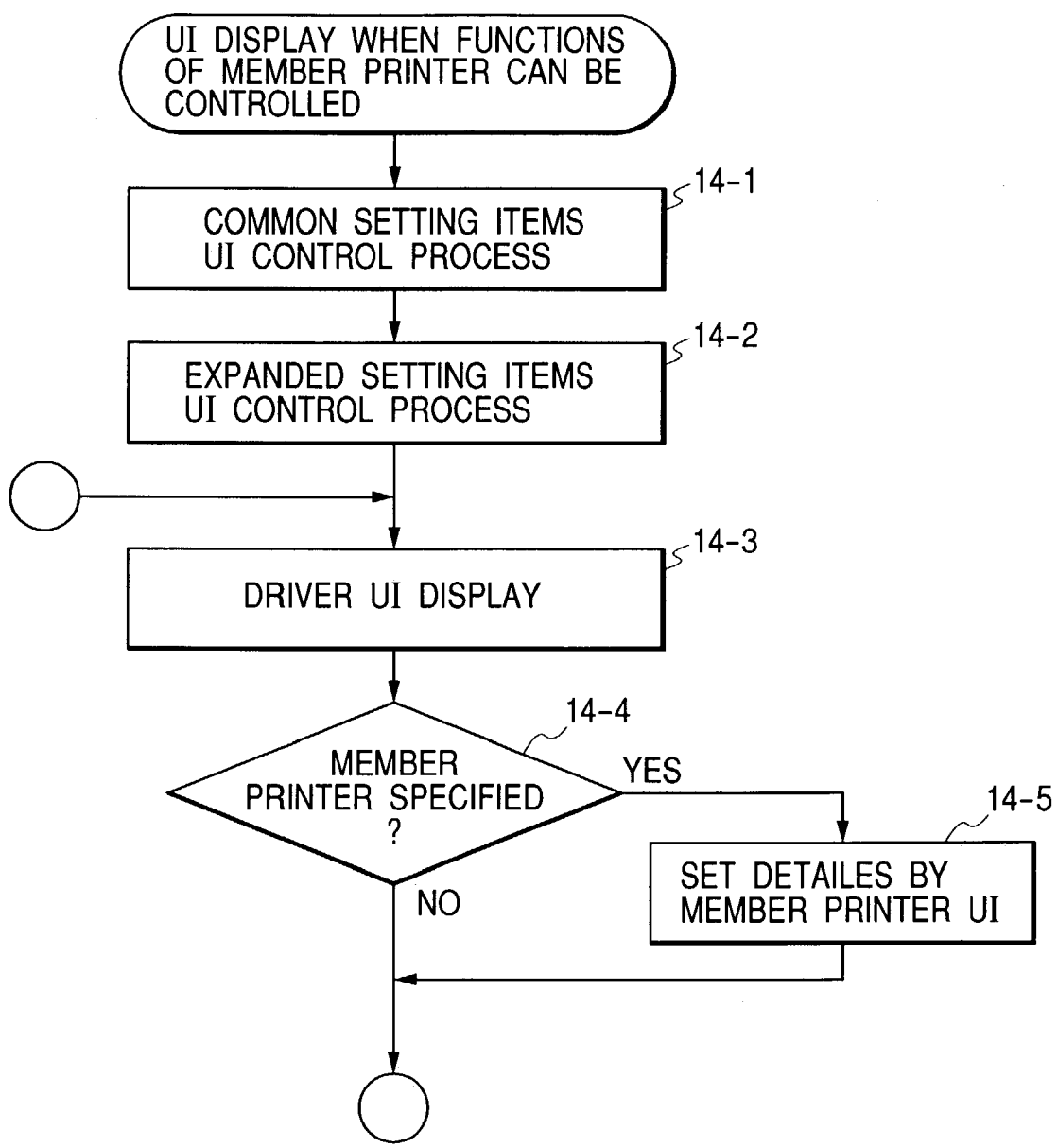
FIG. 14 is a group member printer driver UI display flowchart (common setting items and extended setting items)

FIG. 14 shows the details of step S12-5. In step S14-1, the functions relating to each common setting item of each member printer driver is checked, the conflict processing is performed on the functions, and an item to be displayed by the group printer driver UI is selected based on the result.

In the conflict processing on the functions, the group printer driver UI processes the functions as setting enabled items when there are functions in all member printer drivers to be checked as to whether or not there is a function of each setting item on each member printer driver to be processed on the group printer, and if there is no function in any of the drivers, the corresponding item is processed as a setting disabled item. It is obvious that there is a conflict processing in which the other AND processing is replaced with an OR processing.

The above-mentioned UI control is explained by referring to a practical example.

The printer driver A in FIG. 13C indicates a group printer driver, and the printer drivers B, C and D indicate the member printer driver configuring a group printer driver. In the table, "YES" and "NO" show whether or not each member printer driver supports the function of printing for books, the function of staple printing and the punching function.

First, relating to the function of printing for books, the drivers A and B has the function of printing for books, but the driver C has no such function. Therefore, the group printer driver A does not have the function of printing for books.

Similarly, relating to the function of staple printing, all member printer drivers B, C and D have the function. Therefore, the staple of the group printer driver A is "YES". Relating to the punching function, since all member printer drivers B, C and D have no functions, the punching function of the group printer driver A is "NO".

In step S14-2, the conflict processing of the functions shown in the above-mentioned steps is performed on the extended setting item of each member printer driver.

In step S14-3, depending on the result of the conflict processing performed in steps S14-1 and S14-2, a group printer driver UI display is performed, and the user sets items.

Items are gray-out displayed so that no settings can be made on the UI if there is no function as a result of the conflict, and items are gray-out displayed or not displayed, thereby performing the UI control, and an item having the function is not UI controlled.

FIGS. 17A and 17B show a practical example of the gray-out control and no display control of UI. The two-sided printing on a setting item and a dialog box of printing for books are UI controlled.

In the present step, at a user designation, for example, the UI control is performed such that impossible combinations cannot occur with the punch processing or the staple designated when the "printing for books" is specified, thereby preventing the inconsistency in setting items.

In step S14-4, items having no setting items on the group printer driver UI are set in detail by opening the UI of a member printer so that the member printer to be set on the group printer driver UI can be specified.

In step S14-5, details are set by opening the member printer driver UI specified in the above-mentioned step.

When the member printer driver UI is opened, the items which can be set by the group printer driver can be set, and the processes are doubled when the same functions are set on both sides. Therefore, the following UI control is performed for display. <1> When the member printer is a function-controllable driver, the UI control is performed by gray-out displaying or not displaying the items conflicting with the setting items on the group printer driver UI so that the items cannot be set on the member printer driver UI. <2> When the member printer is a function-uncontrollable driver, common setting items are UI displayed with common setting items set by the member printer driver. After the UI display, when the items are changed on the member printer driver UI, in the step of closing the driver UI, the information about the setting item set on the group printer driver is overwritten on the corresponding common setting item of the member printer driver, thereby suppressing the change of settings on the member printer UI.

When an overwriting process is performed, it is possible to display a warning that, for example, no settings can be valid on the member printer UI.

In the present step, since all target member printers are function-controllable drivers, the UI control in <1> above is performed.

Figure 15:
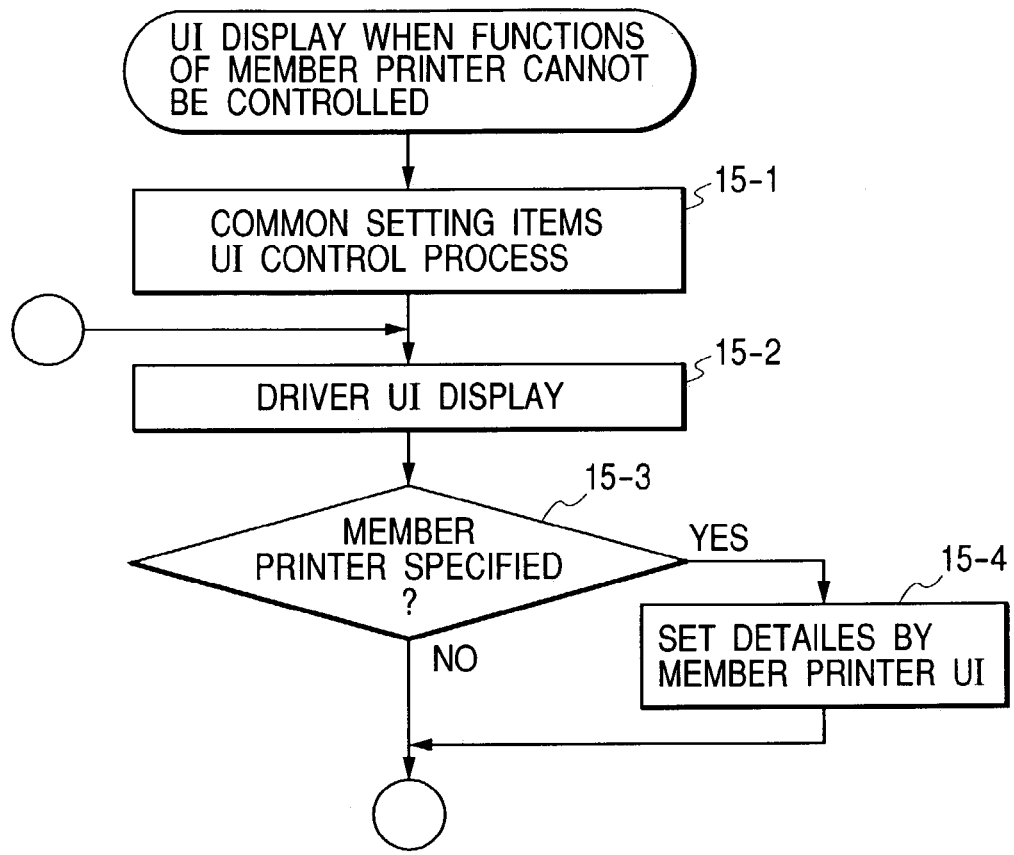
FIG. 15 is a group member printer driver UI display flowchart (common setting items)

FIG. 15 is a flowchart showing the details of step S12-6.

In this step, the configuration of the member printer driver is different from the configuration in step S12-5, that is, a function-controllable driver and a function-uncontrollable driver coexist. Therefore, the items which can be set by the group printer driver UI is limited to the basic setting items whose setting information can be commonly read or written.

In step S15-1, the functions about each common setting item of each member printer driver is checked as in the above-mentioned step S14-1, and the function conflict processing is performed. Based on the result, the items to be displayed on the group printer driver UI is selected.

In step S15-2, the group printer driver UI display is performed based on the result of the UI conflict processing performed in step S12-1. As a result of the conflict processing, invalid functions and extended setting items are gray-out displayed or not displayed so that they cannot be set on the UI.

In step S15-3, the extended setting items and the setting items specific to each member printer that are not able to be set in the said step are set in detail by opening UI of the member printer, thereby setting detailed items, and a member printer to be set can be set on the group printer driver UI.

In step S15-4, the member printer driver UI specified in the above-mentioned step is opened to set detailed items.

Figure 16:
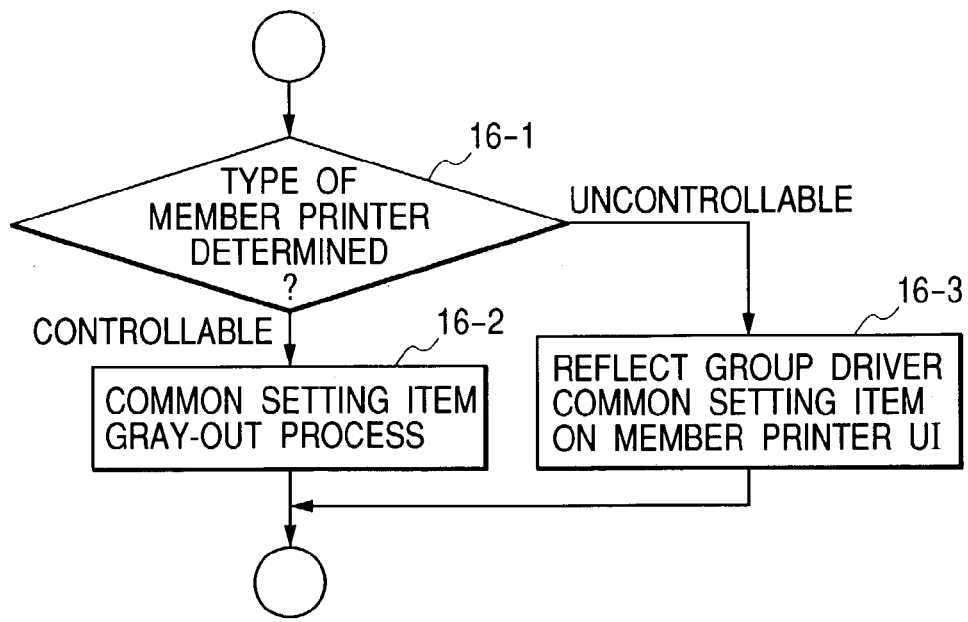
FIG. 16 is a member printer UI display basic flowchart.

FIG. 16 is a flowchart showing the details of step S15-4.

In step S16-1, the type of the member printer driver is determined. If the target driver is a function-controllable driver, then control is passed to step S16-2. Otherwise, control is passed to step S16-3.

In step S16-2, according to the rules indicated in <1> in step S14-5, the common setting item UI of the member printer driver is controlled. The UI is gray-out controlled, etc. on the common setting items, thereby performing the UI display and setting detailed items.

In step S16-3, according to the rules indicated in <2> in step S14-5, the common setting item UI of the member printer driver is controlled. The UI display is performed in the step, and detailed items are set.

When all settings are made on the group printer driver UI, the end of setting button is clicked, thereby passing control to the step of setting terminating process in step S12-7.

In step S12-8, it is checked whether or not the items set by the group printer are inconsistent as the setting items of each member printer driver.

A printer has an item closely related to the functions of a device. For example, the staple enabled position on the A4 form is only the upper left portion of the form on the printer A, or the staple enabled position on the A4 form is only the lower left portion of the form on the printer B, etc.

In this step, in addition to the conflict check about the impossible combination relating to the setting functions performed on each member printer in step S11-3, a check is made on the member printer driver as to whether or not the item set on the group printer driver UI can be reflected as a setting item of each member printer driver.

In step S12-9, the result of the conflict check made in the above-mentioned step is determined. If the setting items set on the group printer driver UI are all valid on the member printer, control is passed to step S12-12, thereby terminating the display of the group printer driver UI. If it is determined that there is an item on which a conflict occurs in the setting items, then control is passed to step S12-10, and a reset button and a forcible execute button are UI displayed with the message, "reset the setting item on the group printer driver UI, or perform the printing process on the current setting item". In step S12-11, it is determined which has been pressed, the reset button or the forcible execute button. If the reset button has been pressed, then the configuration of the member printer returns the status back to step S14-3 or 15-2. If the forcible execute button has been pressed, then control is passed to step S12-12, and the display of the group printer driver UI terminates.

Described below is the relationship between the record of the information set in the above-mentioned UI and the general-purpose print file shown in FIG. 10 according to the present embodiment.

In the present embodiment, relating to the information set in the UI, the driver setting information (DEVMODE) of the group printer driver is recorded on the print designation portion in the general-purpose print file described in FIG. 10 both in a common area and an extended area. The driver setting information (DEVMODE) of each member printer is recorded on the driver information setting portion of the member printer in the general-purpose print file both in a common area and an extended area.

Afterwards, the general-purpose print file is used in the printing process using the print job control system, thereby enabling the printing processing according to the present embodiment.

Described below is the GUI of the group printer driver described in the explanation by referring to steps S14-3 and S15-2.

According to the present embodiment, an output method can be selected from among the rate distributed printing, color/monochrome distributed printing, broadcast printing, and automatic proxy printing by opening the driver UI. By specifying and setting a member printer driver, a plurality of print designation can be performed using one printer driver.

In another embodiment, when the process in step S 12-5 is "UI display when at least one function-controllable member printer driver is included", the step S12-6 is set as "UI display for all function-uncontrollable drivers" in step S12-6, thereby corresponding to the display in step S12-4.

In this case, the "UI display when at least one function-controllable member printer driver is includes" performs the conflict processing using the common setting item and the extended setting item on the function-controllable member printer driver in the group printer driver. If a function-controllable member printer driver UI is individually specified, then a process to avoid double settings is performed by gray-out display on the setting items on the group printer driver. If a function-uncontrollable member printer driver UI is individually specified, then the common setting item in the setting items of the group printer driver is reflected as having been set.

Furthermore, the "UI display for all function-uncontrollable" performs the conflict processing only on the common setting item on the UI of the group printer driver. If a function-uncontrollable member printer driver UI is individually specified, the setting item (common setting item) of the group printer driver is reflected as having been set. For example, if the paper size of A4 is set on the group printer driver, the paper size of A4 is set when the UI of the member printer driver is opened.

Figure 18:
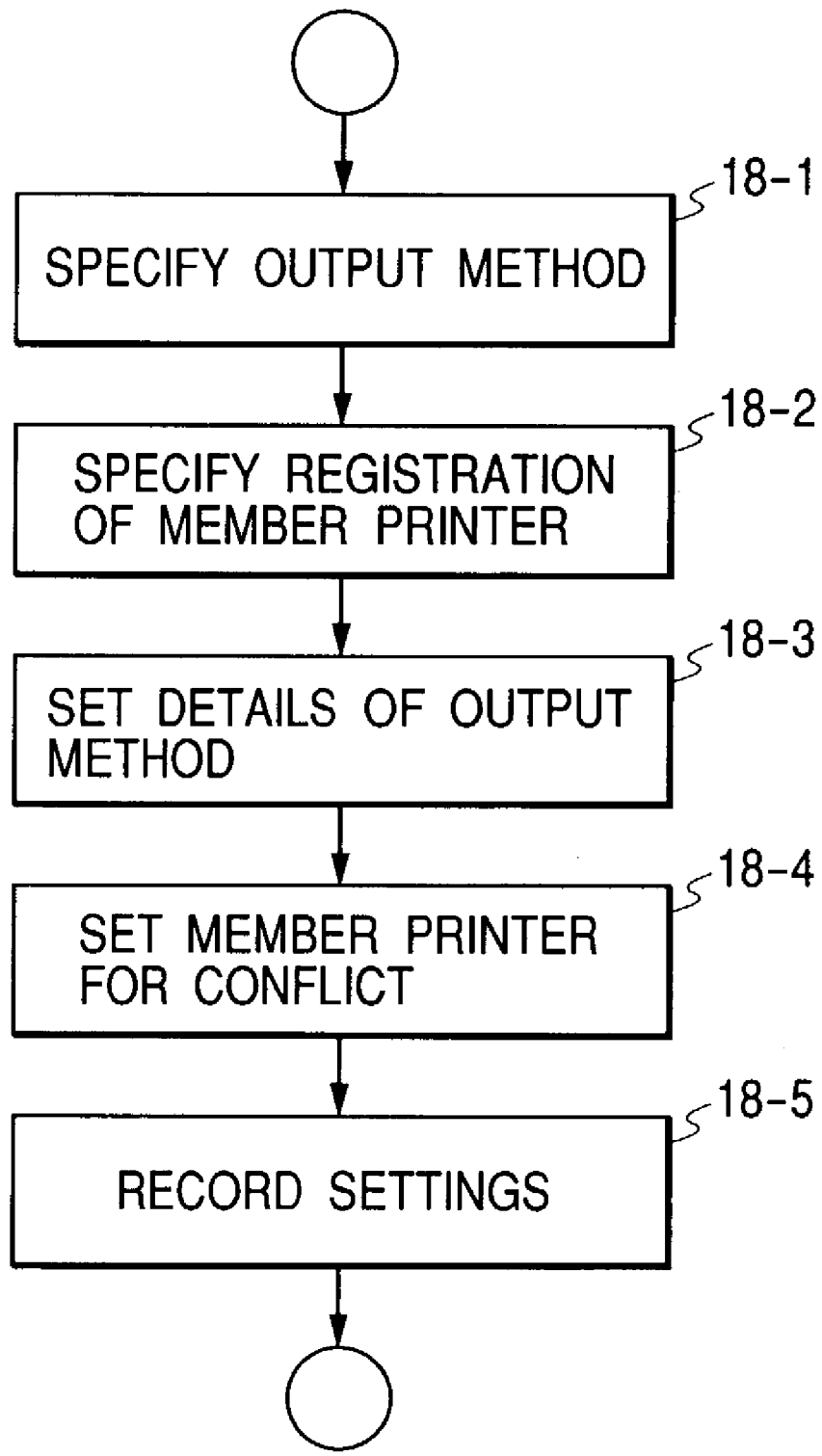
FIG. 18 is a driver UI operation flowchart.

FIG. 18 is a flowchart of the UI operation flow of the group printer driver according to the present embodiment.

In step S18-1, an output method is specified. The output method can be any of the above-mentioned rate distributed printing, color/monochrome distributed printing, broadcast printing, and automatic proxy printing.

Then, control is passed to step S18-2, and a member printer appropriate for each output method is designated for registration.

Then, control is passed to step S18-3, and the detailed designation is performed on each output method.

Next, control is passed to step S18-4, and a member printer as a conflict target in each output method is set. Only on the member printer set in this process, the conflicting operation between the group printer driver and the member printer driver is performed as explained by referring to FIGS. 12 to 17A and 17B.

If the rate distributed printing (same in meaning as the distributed printing) is selected as an output method as an example of the present embodiment, the member printers as conflict targets are all printer drivers of member printers of the distribution destination.

Then, control is passed to step S15-5, and each of the set items is recorded. The setting item can be recorded by recording it in the general-purpose print file explained by referring to FIG. 10. For example, the above-mentioned setting item can be recorded using the output method designation portion especially for the setting item in step S15-1 in the document data portion 10-b of the general-purpose print file. For the setting item in step S18-2, it is recorded using the number of member printers, the name of the member printer driver, and the member printer driver information setting portion. In the setting item in step S18-3, it is recorded using the group printer driver setting information portion.

Described below is the relationship between the application and the group printer driver in the process of notifying the application of the paper size according to the present embodiment in FIG. 19.

An application is provided with the function of obtaining the capability of the printer driver normally selected as a print target through the API (1901) defined by the OS (for example, Windows (R)). Especially, a DTP type application inquires of the printer driver about each type of information printable by the printer driver selected as a print target, for example, paper size information (supported form size), and the paper size and the function which can be defined in the application according to the information can be limited. Practically, when the application is notified of only "A4" as support information from the printer driver, it is anticipated that a problem will occur when the paper size of A3 is set in the application, and warning information about a prompt to change the paper size is issued.

Figure 19:
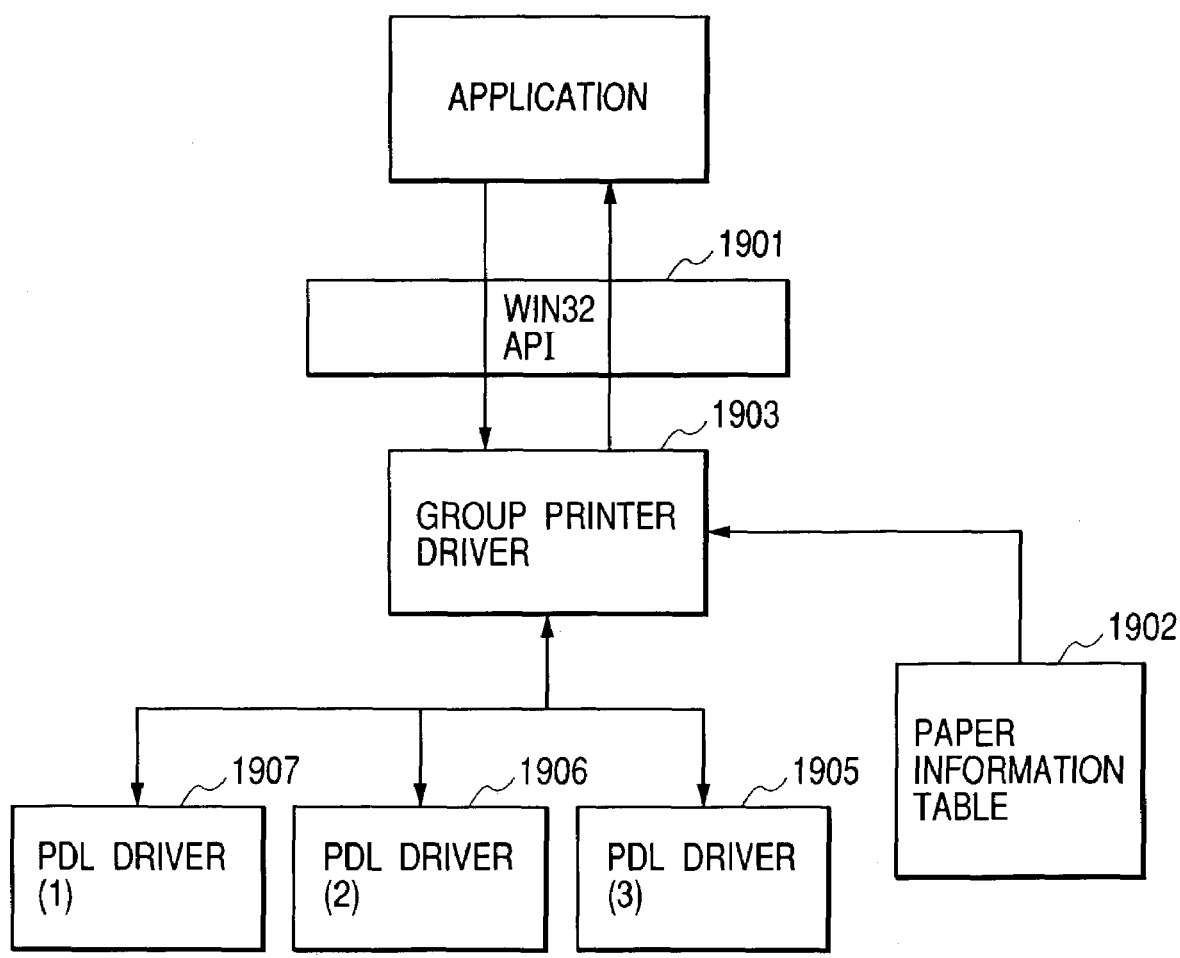
FIG. 19 shows a data flow of paper information.

In FIG. 19, the arrow from the application 601 to the group printer driver 603 shows the flow of data when a request for form information is issued from the appropriate to the group printer driver 603 selected by the application to print using the Win32API which is defined by Windows (R).

On the other hand, the arrow from the group printer driver 603 to the application 601 shows the flow of data when the capability of form information is returned from the group printer driver 603 to the application 601. The present embodiment is not limited to the API of Windows (R), but can be realized by using the function prepared by another OS.

The arrow connecting the group printer driver 603 to each PDL driver shows the control of the conflict relating to each type of information about the group printer driver and the member printer driver explained by referring to FIG. 18.

The present embodiment also includes form size list information relating to the form information. Furthermore, in the attached drawings, a form information table 1902 stores form information specific to a group printer driver. The table is obtained by exclusively defining a table for a group printer driver. When the group printer driver is loaded (activated), it is loaded into the memory together with the table. The form information table can be defined as a registry and an external file. The contents of the list of paper sizes can be set as a paper size list covering all paper sizes supported by the member printer driver which can be a member printer of a group printer driver. The arrow from the form information table 1902 to the group printer driver 603 shows the flow of data when the group printer driver 603 obtains the form information about paper sizes, etc.

Described below is the flow of the group printer driver notifying the application of form information.

Figure 20:
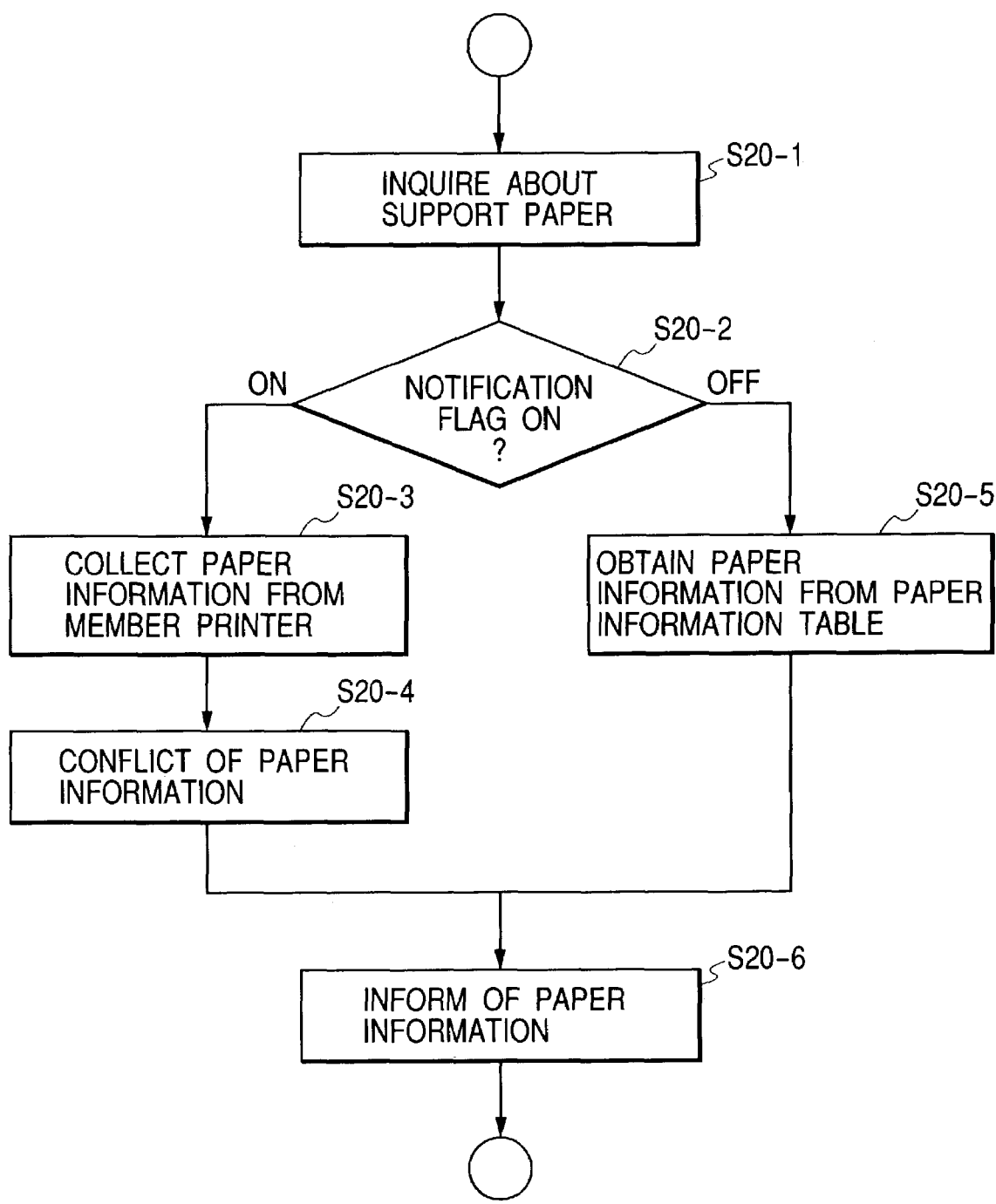
FIG. 20 is a paper information notifying process flowchart.

FIG. 20 is a flowchart notifying the application from the group printer driver of the form information.

First, in step S20-1, the group printer driver receives an instruction to inquire about the supported form from the application.

Then, in step S20-2, it is determined whether or not the notification flag of the paper size is set ON. If the flag is set ON, the, control is passed to step S20-3.

In step S23-3, each member printer driver registered corresponding to the group printer driver is asked about a list of supported form sizes.

Control is passed to step S20-4, where for the list of the form sizes corrected in the step S20-3, a conflict processing of setting the paper size of the group printer driver for the supported form size commonly defined by all member printers is performed. For example, if the conflict processing is performed by collecting the information about the supported forms of (A4, A3, B5), (A4, A3, B4), and (A4, A3) from the member printer drivers A, B and C, then the paper size information returned to the application from the group printer driver is (A4, A3).

Then, control is passed to step S20-6, where the size of the paper processed in the above-mentioned step S20-4 is transmitted to the application as a paper size list of the group printer driver.

If the notification flag is OFF in the above-mentioned step S20-2, then control is passed to step S20-5, and a list of supported form sizes is obtained from the form information table (one or more paper sizes supported by the default of a group printer driver) defined in advance. Then, control is passed to step S20-6, and the application is notified of the paper size list obtained in step S20-5.

Figure 21A:
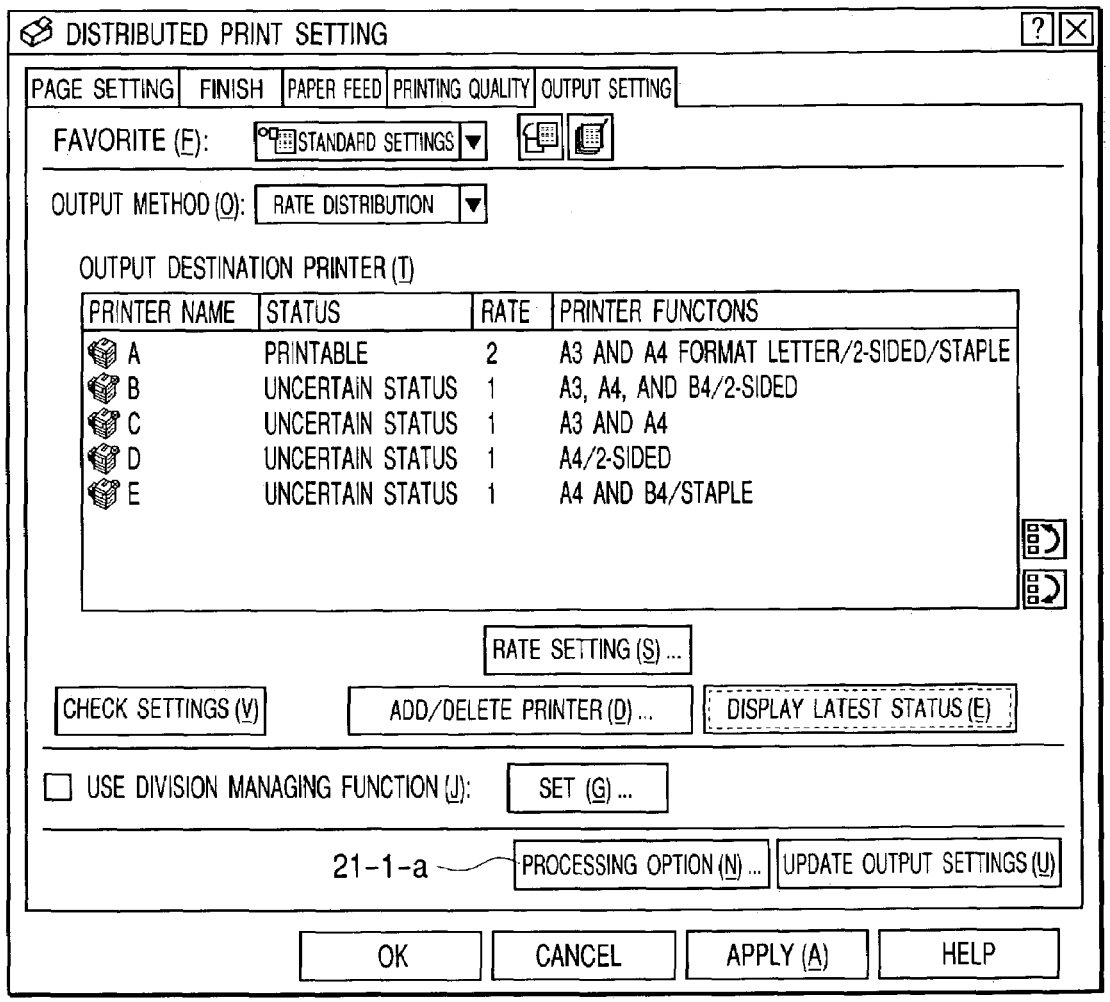
FIGS. 21A and 21B show an example of a driver UI of output setting.
Figure 21B:
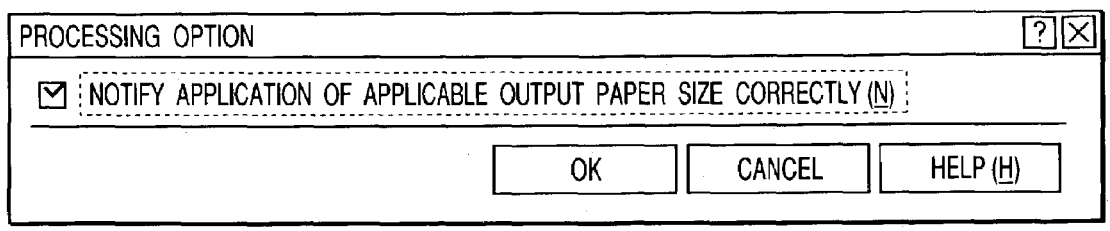

Then, by referring to FIGS. 21A and 21B, the setting UI of the notification flag determined in step S20-2 shown in FIG. 20 is explained.

FIG. 21A shows a sheet of group printer driver performing the selection of an output method, the registration and designation of a member printer, etc. explained above by referring to FIG. 18 and preceding figures. In FIGS. 21A and 21B, reference numeral 21-1-*a* denotes a button for display of the setting UI of a notification flag described in step S20-2 shown in FIG. 20. If the button is pressed, a notification flag setting screen is displayed in FIG. 21B. In FIGS. 21A and 21B, "correctly notifying the application of the available output paper size" shown in FIGS. 21A and 21B cooperates with the notification flag. When the check box indicates "checked", the notification flag is ON. When the check box indicates "not checked", the notification flag is OFF.

When the flowchart shown in FIG. 20 is realized, the conflict processing can be omitted, thereby realizing an efficient printing process with high-speed throughput. Furthermore, since it can be set whether or not the conflict processing is to be selectively performed through a user interface, the printing system can be constructed for the user convenience.

Second Embodiment

In the first embodiment, the notification capability of the group printer driver is based on the paper size. In the second embodiment, in addition to the paper size, the explanation is given below based on the printable area information (upper, lower, left and right margins).

The difference from the first embodiment is that not a list of paper sizes, but a list of printable area information (information showing a region that allows images to be generated according to the form sizes) of each device is used for a form information table in 1902 shown in FIG. 19, and that not paper information, but printable area information is used as data in steps S20-3, S20-4, and S20-5 in FIG. 20.

In the second embodiment, the paper size in the first embodiment is replaced with the printable area, but it is not limited to this area. For example, a printable area is replaced with the margin information about each member printer driver, resolution information, etc. for use as paper size.

It is also predicted that, not only specific information, but a paper size, a printable area, resolution information, etc. are collectively treated in the conflict processing. In this case, the notification flag setting screen of FIG. 21B is not used to set the check flag only for a paper size, but is used to designate a check flag to set whether or not the conflict processing is to be performed on a plurality of conflict items.

Furthermore, a further application example is, for example, a user interface as indicated in FIG. 21B is provided independent of each of the paper size, the printable area and the resolution.

In this case, a plurality of the check boxes, such as indicated in FIG. 21B, are provided for each item, and at an instruction of each check box, the notification flag is set ON/OFF corresponding to each item. Depending on ON/OFF of the check flag of each item, the flowchart shown in FIG. 20 is followed for each item. At this time, the information table corresponding to the form information table 1902 shown in FIG. 19 is prepared for each item, and a table corresponding to the process in step S20-5 for each item is referred to. Furthermore, steps S20-1, S20-3, S20-4 and S20-6 are performed on a target item for each item.

According to the second embodiment, various items (paper size, printable area, margin information, resolution, etc.) or a combination of the items can be applied to the first embodiment, thereby realizing a user-desired printing environment.

Other Embodiments

The objects of the present invention can also be attained by the computer (or CPU, MPU, etc.) of the system or the apparatus reading a program code of the software for realizing the functions of the above-mentioned embodiment stored in the storage medium.

In this case, the function of the above-mentioned embodiment is realized by the program code read from the storage medium, and the storage medium storing the program code can configure the present invention.

A storage medium for providing a program code can be, a floppy (R) disk, a hard disk, an optical disk, a magneto optical disk, CD-ROM, CD-R, a magnetic tape, a non-volatile memory card, ROM, etc.

Furthermore, by executing the program code read by the computer, not only the function of the above-mentioned embodiment can be realized, but also the OS (operating system), etc. operating on the computer based on the instruction of the program code performs all or a part of the actual process. The case in which the function of the above-mentioned embodiment is realized in the above-mentioned processes is also included.

Additionally, after the program code read from the storage medium is written to the memory in the function extension unit connected to the function extended board inserted into a computer and the function extended unit connected to the computer, the CPU provided in the function extended board and the function extended unit performs all or a part of the actual process at an instruction of the program code so that the function of the above-mentioned embodiments can be realized.

As described above, in a printing process for controlling a print job on a plurality of image input/output apparatus bound on a virtual image input/output apparatus, one virtual printer (group printer) receives an inquiry from an application, and can notify the application of the capability according to the configuration of a member printer, thereby realizing a printing environment capable of avoiding the occurrence of an error.

Especially, relating to the list of supported paper sizes the paper size of the document generated on an application matches the paper size used in outputting the actual member printer. Since the paper size of a document matches the paper size used in the actual output, outputting an image in an incomplete image area is avoided.

Furthermore, a conflict process is omitted from the group printer driver to an application, thereby performing a high-speed response. For example, when print settings such as a constant paper size, resolution, etc. is performed, an efficient and virtual printing environment can be realized.

What is claimed is:

1. A printing method by a group printer driver capable of controlling a plurality of member printers, the method comprising:
    a receiving step of receiving a request for a capability notification of the group printer driver from an application;
    a determining step of determining, as a capability notification method, whether or not a conflict result of capabilities of the plurality of member printers is to be informed;
    an information collecting step of collecting information from each of the plurality of member printers when it is determined in the determining step that the conflict result of the capabilities of the plurality of member printers is to be informed;
    a conflict processing step of performing conflict processing on the information collected in the information collecting step, when it is determined in the determining step that the conflict result of the capabilities of the plurality of member printers is to be informed;
    a first notifying step of notifying to the application the conflict result obtained by the conflict processing performed in the conflict processing step, when it is determined in the determining step that the conflict result of the capabilities of the plurality of member printers is to be informed; and
    a second notifying step of notifying to the application a capability defined in the group printer driver when it is determined in the determining step that the conflict result of the capabilities of the plurality of member printers is not to be informed.

2. The printing method according to claim 1, wherein said capability includes information about paper size supported by a member printer driver.

3. The printing method according to claim 1, wherein said determining step can be switched by a user on a GUI of a group printer driver.

4. The printing method according to claim 1, further comprising a conflict processing step of performing conflict processing depending on function-controllability or function-uncontrollability by each of the plurality of member printer drivers.

5. A printing processing apparatus for use with a group printer driver capable of controlling a plurality of member printers, the printing processing apparatus comprising:
    reception means for receiving a request for capability notification of the group printer driver from an application;
    determining means for determining as a capability notifying method whether or not a conflict result of capabilities of the plurality of member printers is to be informed;
    information collection means for collecting information from each of the plurality of member printers when said determining means determines that the conflict result of the capabilities of the plurality of member printers is to be informed;
    conflict processing means for performing conflict processing on the information collected by said information collection means;
    capability notification means for notifying to the application the conflict result obtained by the conflict processing performed by said conflict processing means, when said determining means determines that the conflict result of the capabilities of the plurality of member printers is to be informed; and
    notification means for notifying to the application a capability defined in the group printer driver when said determining means determines that the conflict result of the capabilities of the plurality of member printers is not to be informed.

6. The printing processing apparatus according to claim 5, wherein the capability includes a list of paper sizes supported by a printer driver.

7. The printing processing apparatus according to claim 5, wherein the determining means can be switched by a user on a GUI of a group printer driver.

8. The printing processing apparatus according to claim 5, further comprising conflict processing means for performing conflict processing depending on whether the plurality of member printer drivers are function-controllable or function-uncontrollable.

9. A printing program stored on a computer-readable medium and executed by an information processing apparatus for realizing a control method by a group printer driver capable of controlling a plurality of member printers, the method comprising:
    a receiving step of receiving a request for a capability notification of the group printer driver from an application;

a determining step of determining, as a capability notification method, whether or not a conflict result of capabilities of the plurality of member printers is to be informed;

an information collecting step of collecting information from each of the plurality of member printers when it is determined in the determining step that the conflict result of the capabilities of the plurality of member printers is to be informed;

a conflict processing step of performing conflict processing on the information collected in the information collecting step, when it is determined in the determining step that the conflict result of the capabilities of the plurality of member printers is to be informed;

a capability notifying step of notifying to the application the conflict result obtained by the conflict processing performed in the conflict processing step, when it is determined in the determining step that the conflict result of the capabilities of the plurality of member printers is to be informed; and a notifying step of notifying to the application a capability defined in the group printer driver when it is determined in the determining step that the conflict result of the capabilities of the plurality of member printers is not to be informed.

10. The printing program according to claim 9, wherein the capability includes a list of paper sizes supported by a printer driver.

11. The printing program according to claim 9, wherein the determining step can be switched by a user on a GUI of a group printer driver.

12. The printing program according to claim 9, further comprising a conflict processing step of performing conflict processing depending on function-controllability or function-uncontrollability by each of the plurality of member printer drivers.

* * * * *

UNITED STATES PATENT AND TRADEMARK OFFICE
CERTIFICATE OF CORRECTION

PATENT NO. : 7,372,590 B2
APPLICATION NO. : 10/443088
DATED : May 13, 2008
INVENTOR(S) : Shigeki Kuroda It is certified that error appears in the above-identified patent and that said Letters Patent is hereby corrected as shown below:

IN THE DRAWINGS
Sheet 15, Fig. 14, Item 14-5, "DETAILES" should read --DETAILS--.
Sheet 16, Fig. 15, Item 15-4, "DETAILES" should read --DETAILS--.

COLUMN 3
Line 43, "driver." should read --drivers.--.

COLUMN 8
Line 21, "assigned" should read --assigned)--.

COLUMN 9
Line 9, "driver" should read --driver.--.
Line 17, "driver" should read --drivers--.

COLUMN 10
Line 9, "above-mentioned" should read --above--.
Line 17, "format," should read --format--.

COLUMN 12
Line 47, "item" should read --item is--.

COLUMN 13
Line 14, "B has" should read --B have--.

COLUMN 14
Line 21, "is" should read --are--.

COLUMN 15
Line 41, "designation" should read --designations--.
Line 42, "S 12-5" should read --S12-5--.
Line 48, "includes" should read --included--.

UNITED STATES PATENT AND TRADEMARK OFFICE
CERTIFICATE OF CORRECTION

PATENT NO. : 7,372,590 B2
APPLICATION NO. : 10/443088
DATED : May 13, 2008
INVENTOR(S) : Shigeki Kuroda It is certified that error appears in the above-identified patent and that said Letters Patent is hereby corrected as shown below:

COLUMN 17
Line 27, "the," should read --then--.
Line 28, "23-3," should read --20-3,--.
Line 32, "corrected" should read --collected--.

COLUMN 18
Line 6, "user" should read --user's--.

COLUMN 19
Line 1, "be," should read --be--.
Line 30, "sizes" should read --sizes,--.
Line 32, "outputting" should read --outputting from--.
Line 39, "etc. is" should read --etc., are--.

Signed and Sealed this

Sixteenth Day of December, 2008

JON W. DUDAS
*Director of the United States Patent and Trademark Office*